United States Patent
Ling et al.

(10) Patent No.: US 10,715,873 B1
(45) Date of Patent: *Jul. 14, 2020

(54) METHOD AND SYSTEM FOR PERSONALIZING THE DISPLAY OF RECORDINGS STORED IN A USER RECEIVING DEVICE

(71) Applicant: The DIRECTV Group, Inc., El Segundo, CA (US)

(72) Inventors: Sui-Ky Ringo Ling, Rancho Palos Verdes, CA (US); Raynold M. Kahn, Los Angeles, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/437,341

(22) Filed: Jun. 11, 2019

Related U.S. Application Data

(63) Continuation of application No. 14/676,020, filed on Apr. 1, 2015, now Pat. No. 10,397,659.

(51) Int. Cl.
| | |
|---|---|
| H04N 21/482 | (2011.01) |
| H04N 21/4147 | (2011.01) |
| H04N 21/472 | (2011.01) |
| H04N 21/466 | (2011.01) |
| H04N 21/45 | (2011.01) |

(52) U.S. Cl.
CPC ..... *H04N 21/4826* (2013.01); *H04N 21/4147* (2013.01); *H04N 21/4532* (2013.01); *H04N 21/4668* (2013.01); *H04N 21/47211* (2013.01); *H04N 21/47214* (2013.01)

(58) Field of Classification Search
CPC .......... H04N 21/4826; H04N 21/4147; H04N 21/4532; H04N 21/47211; H04N 21/4668; H04N 21/47214
See application file for complete search history.

(56) References Cited

U.S. PATENT DOCUMENTS

| | | |
|---|---|---|
| 8,595,769 B2 | 11/2013 | Matz |
| 2006/0045471 A1 | 3/2006 | Proidl et al. |
| 2007/0044132 A1 | 2/2007 | Kubo et al. |
| 2007/0230901 A1 | 10/2007 | Shimotashiro et al. |
| 2009/0142035 A1 | 6/2009 | Kummer et al. |
| 2010/0031293 A1 | 2/2010 | Ohde et al. |
| 2010/0262986 A1 | 10/2010 | Adimatyam et al. |
| 2012/0331494 A1 | 12/2012 | Pontual et al. |
| 2013/0081085 A1 | 3/2013 | Skelton et al. |
| 2013/0227597 A1 | 8/2013 | Baskaran et al. |
| 2014/0047467 A1 | 2/2014 | Arling et al. |
| 2014/0082645 A1 | 3/2014 | Stern et al. |
| 2016/0080822 A1 | 3/2016 | Arling et al. |
| 2016/0142783 A1 | 5/2016 | Bagga et al. |

*Primary Examiner* — Gelek W Topgyal
(74) *Attorney, Agent, or Firm* — Harness, Dickey & Pierce, P.L.C.

(57) ABSTRACT

A system and method for operating the same includes a memory and a controller that stores content in the memory to form stored content. The controller receives a display request for displaying content from a user device through a network. The display request comprises a user device identifier. The controller determines a timeslot corresponding to the display request, retrieves a content list corresponding to stored content, reorders the content list in response to the timeslot and the user device identifier to form a reordered list and communicates the reordered list to the user device.

20 Claims, 34 Drawing Sheets

| Event | Channel | Time Event Generated | Time In Event | Program |
|---|---|---|---|---|
| <Timeslot Begin> | A | - | - | P1 |
| Channel Change | B | 01:30 | 01:30 | - |
| Live TV Viewing | B | 0:200 | 01:30 | P2 |
| Channel Change | C | 06:00 | 06:00 | - |
| Channel Change | D | 06:20 | 06:20 | - |
| Channel Change | B | 06:45 | 06:45 | - |
| Live TV Viewing | B | 07:15 | 06:45 | P2 |
| Channel Change | A | 09:30 | 09:30 | - |
| Live TV Viewing | A | 10:00 | 09:30 | P1 |
| Channel Change | D | 15:30 | 15:30 | - |
| Live TV Viewing | D | 16:00 | 15:30 | P3 |
| Channel Change | B | 16:30 | 16:30 | - |
| Live TV Viewing | B | 17:00 | 16:30 | P2 |
| Live TV Viewing | B | 25:00 | 25:00 | P4 |

FIG. 6

| Program | Channel | Tune Start | Tune End | Tune Duration |
|---|---|---|---|---|
| P1 | A | (start of timeslot) | 01:30 | 1 min 30 sec |
| P2 | B | 01:30 | 06:00 | 4 min 30 sec |
| P2 | B | 06:45 | 09:30 | 2 min 45 sec |
| P1 | A | 09:30 | 15:30 | 6 min |
| P3 | D | 15:30 | 16:30 | 1 min |
| P2 | B | 16:30 | 25:00 | 8 min 30 sec |
| P4 | B | 25:00 | (end of timeslot) | 5 min |

FIG. 7

| Category Vectors | Action | Comedy | Cosine Similarity = T*C |
|---|---|---|---|
| Target T1 | 0.5 | 0.87 | cos(0) = 0.5^2 + 0.87^2 = 1 |
| Candidate C1 | 1/√2 | 1/√2 | cos(15) = 0.5+0.87/√2 = 0.97 |
| Candidate C2 | 0 | 1 | cos(30) = 0.87 |
| Candidate C3 | 1 | 0 | cos(60) = 0.5 |

| Category Index | Initial Weights | Adjusted Weights | Normalized Weights |
|---|---|---|---|
| 1 | 0.13 | 0.40 | 0.31 |
| 2 | 0.67 | 0.94 | 0.72 |
| 3 | 0.72 | 0.72 | 0.55 |
| 4 | 0.12 | 0.39 | 0.30 |

| Title | Content ID | Ch. | Date | Timeslot | User Device ID | Watched |
|---|---|---|---|---|---|---|
| Seinfield | 1 1 10 3 | 217 | 13 days ago | 07:00pm - 07:30pm | 2 | 12 minutes |
| Seinfield | 1 1 10 5 | 217 | 12 days ago | 07:00pm - 07:30pm | 2 | 19 minutes |
| NFL Football | 1 1 30 0 | 729 | 10 days ago | 10:00am - 10:30am | 1 | 23 minutes |
| NFL Football | 1 1 30 0 | 729 | 10 days ago | 10:30am - 11:00am | 1 | 28 minutes |
| NFL Football | 1 1 30 0 | 729 | 10 days ago | 11:00am - 11:30am | 1 | 27 minutes |
| NFL Football | 1 1 30 0 | 729 | 10 days ago | 11:30am - 12:00pm | 1 | 29 minutes |
| NFL Football | 1 1 30 0 | 729 | 10 days ago | 12:00pm - 12:30pm | 1 | 29 minutes |
| NFL Football | 1 1 30 0 | 729 | 10 days ago | 12:30pm - 1:00pm | 1 | 22 minutes |
| Lost | 1 1 45 2 | 710 | 8 days ago | 09:00pm - 09:30pm | 3 | 27 minutes |
| Lost | 1 1 45 2 | 710 | 8 days ago | 09:30pm - 10:00pm | 3 | 28 minutes |
| Evening News | 1 1 50 0 | 705 | 5 days ago | 07:00pm - 07:30pm | 4 | 14 minutes |
| Seinfield | 1 1 10 6 | 217 | 5 days ago | 07:00pm - 07:30pm | 4 | 10 minutes |
| Simpsons | 1 1 20 7 | 216 | 4 days ago | 07:00pm - 07:30pm | 4 | 27 minutes |
| Simpsons | 1 1 20 7 | 216 | 3 days ago | 07:00pm - 07:30pm | 4 | 18 minutes |
| Seinfield | 1 1 10 8 | 217 | 3 days ago | 07:00pm - 07:30pm | 2 | 11 minutes |
| Lost | 1 1 45 5 | 710 | 2 days ago | 09:00pm - 09:30pm | 3 | 29 minutes |
| Lost | 1 1 45 5 | 710 | 2 days ago | 09:30pm - 10:00pm | 3 | 26 minutes |
| Seinfield | 1 1 10 4 | 376 | Yesterday | 11:00pm - 11:30pm | 2 | 20 minutes |

FIG. 22

| Title | Content ID | Ch. | Date | Start Time | Duration |
|---|---|---|---|---|---|
| Simpsons | 1 1 20 8 | 215 | Today | 07:00 pm | 30 minutes |
| Futurama | 1 1 47 34 | 216 | Today | 07:00 pm | 30 minutes |
| Seinfeld | 1 1 10 9 | 217 | Today | 07:00 pm | 30 minutes |
| Psych | 1 1 80 0 | 710 | Today | 07:00 pm | 1 hour |
| Golf | 1 1 32 0 | 729 | Today | 06:00pm | 3 hours |
| Simpsons | 1 1 20 9 | 215 | Today | 07:30pm | 30 minutes |
| Futurama | 1 1 47 35 | 216 | Today | 07:30pm | 30 minutes |
| Nightly News | 1 1 80 0 | 217 | Today | 07:30pm | 30 minutes |
| House | 1 1 80 0 | 710 | Today | 08:00pm | 1 hour |
| Sportscenter | 1 1 58 0 | 729 | Today | 09:00pm | 1 hour |
| Family Guy | 1 1 46 17 | 306 | 3 days from now | 09:00pm | 30 minutes |

FIG. 23

| Title | Content ID | Ch. | Date | Start Time | Duration |
|---|---|---|---|---|---|
| Simpsons | 1 1 20 8 | 215 | Today | 07:00 pm | 30 minutes |
| Futurama | 1 1 47 34 | 216 | Today | 07:00 pm | 30 minutes |
| Seinfeld | 1 1 10 9 | 217 | Today | 07:00 pm | 30 minutes |
| Psych | 1 1 80 0 | 710 | Today | 07:00 pm | 1 hour |
| Golf | 1 1 32 0 | 729 | Today | 06:00pm | 3 hours |
| House | 1 1 81 0 | 710 | Today | 08:00pm | 1 hour |
| Sportscenter | 1 1 58 0 | 729 | Today | 09:00pm | 1 hour |
| Simpsons | 1 1 20 9 | 806 | Today | 07:30pm | 30 minutes |
| Family Guy | 1 1 46 17 | 306 | 3 days from now | 09:00pm | 30 minutes |

FIG. 24

METHOD AND SYSTEM FOR PERSONALIZING THE DISPLAY OF RECORDINGS STORED IN A USER RECEIVING DEVICE

CROSS-REFERENCE TO RELATED APPLICATIONS

This application is a continuation of U.S. application Ser. No. 14/676,020, filed on Apr. 1, 2015. The entire disclosures of the above applications are incorporated herein by reference.

TECHNICAL FIELD

The present disclosure relates generally to providing recommendations for content users, and, more specifically, to a method and system for displaying recommended content at a set top box.

BACKGROUND

The statements in this section merely provide background information related to the present disclosure and may not constitute prior art.

Television programming content providers are increasingly providing a wide variety of content to consumers. Available content is typically displayed to the user using a grid guide. The grid guide typically includes channels and timeslots as well as programming information for each information timeslot. The programming information may include the content title and other identifiers such as actor information and the like.

Because the number of channels is so great, all of the channels cannot be simultaneously displayed on the screen display. A user can scroll up and down and sideways to see various portions of the program guide for different times and channels. Because of the large number of content titles, and timeslots and channels, is often difficult to decide on a program selection to view.

In a typical content providing system, a user must pre-schedule content to be recorded within a user device. If the content is broadcasted without the user scheduling a recording, the content may forever be unavailable to the user.

SUMMARY

The present disclosure provides a system and method for displaying generated recommendations in a personalized manner.

In one aspect of the disclosure, a method includes storing content to form stored content and communicating a display request for displaying content from a user device. The display request comprises a user device identifier. The method also includes determining a timeslot corresponding to the display request, retrieving a content list corresponding to stored content, reordering the content list in response to the timeslot and the client identifier to form a reordered list, communicating the reordered list to the user device and displaying the reordered list at a display associated with user device.

In a further aspect of the disclosure, a system and method for operating the same includes a memory and controller that stores content in the memory to form stored content. The controller receives a display request for displaying content from a user device through a network. The display request comprises a user device identifier. The controller determines a timeslot corresponding to the display request, retrieves a content list corresponding to stored content, reorders the content list in response to the timeslot and the user device identifier to form a reordered list and communicates the reordered list to the user device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 6 is a table of the channel tune events corresponding to the plot of FIG. 5.

FIG. 7 is a channel tune time calculation table having various tune times for the various programs.

FIG. 22 is a table for the set top box viewer tracker log.

FIG. 23 is the program guide data associated with the example for FIG. 22.

FIG. 24 is an example of program guide data for a new set top box.

DETAILED DESCRIPTION

Figure 1:
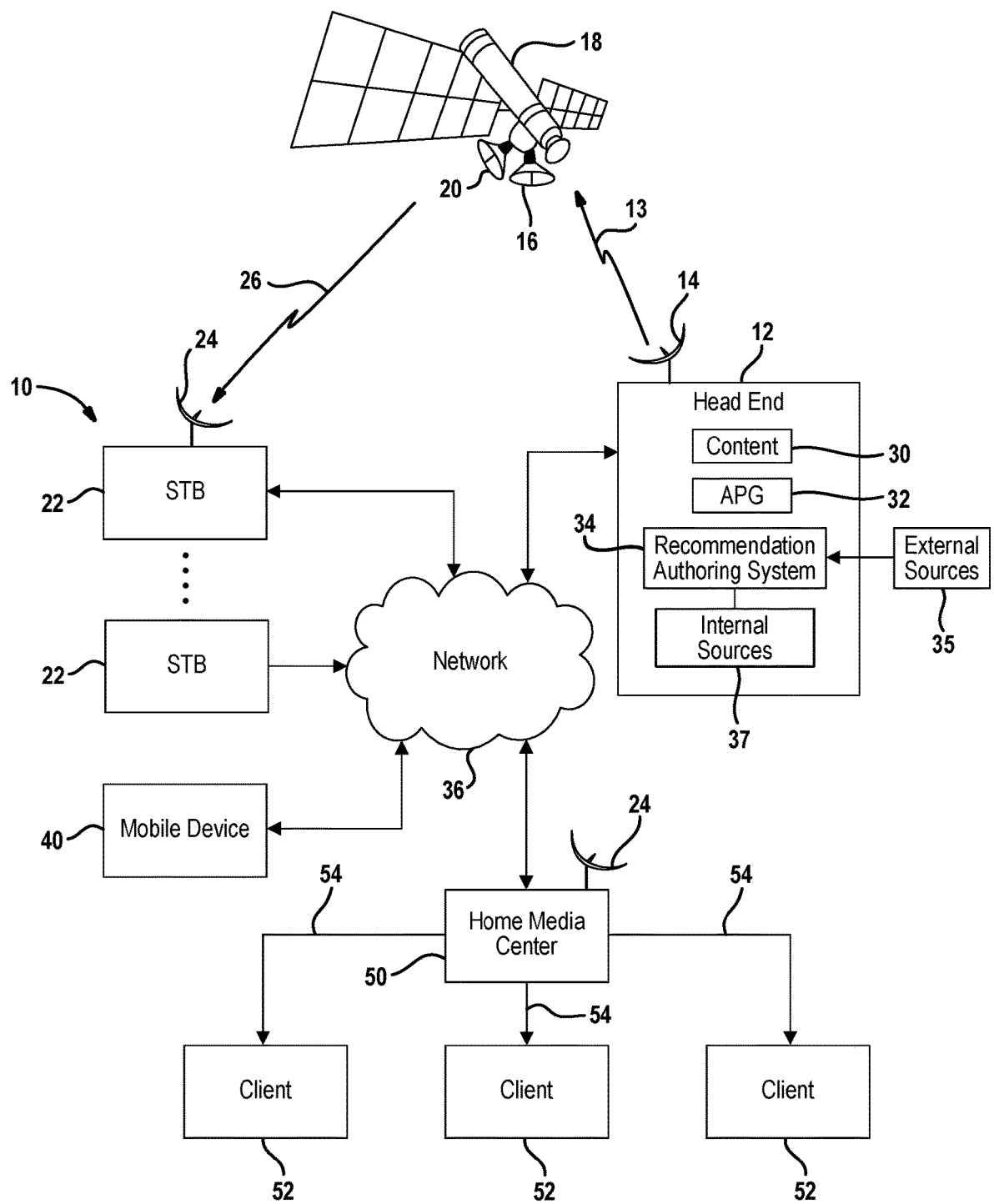
FIG. 1 is a high level block diagrammatic view of a recommendation system according to the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. As used herein, the content will be used to refer to, for example, a movie or program itself. Content identifier refers to the data associated with content used for identifying the content. Machines may use an actual numeric or alphanumeric value unique to the content. People may use a title for identification. Both types and other types of data may be associated with the content for association. For program guides and recommendations list content identifiers, a cluster identifier and other data may also be provided with the content.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

In the following examples, recommendations of titles of various programs are provided. The content recommendations may provide a title either graphically or alpha-numerically or a combination of both. Graphically, content posters or thumbnails may be provided. Several lists are generated, sorted and processed herein. The lists may include content or program titles or one or more alphanumeric identifiers or both. The list may not contain the actual content itself.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals that are directed to various receiving systems including stationary systems such as those in the home, as well as, mobile receiving systems. As is illustrated the receiving systems are referred to as a set top box or user device 22. Each user device 22 is in communication with a respective antenna 24. Each antenna 24 receives downlink signals 26 from the transmitting antenna 20 of the satellite 18. Thus, the user devices may be referred to as satellite television receiving devices.

The head end 12 may communicate various content 30 or program guide data 32 through the satellite 18. The user device 22 may receive the content 30 and program guide data 32 for use therein. The head end 12 may also include a recommendation authoring system 34. The recommendation authority system 34 generates an external recommendation list that is ultimately communicated to each of the user devices. The external recommendation list may include recommended content titles, related content to the recommended content and the strength of similarity score between the related content and recommended content. In this case both the recommended content and the related content refer to content titles for the specific programming. The external recommendation list may include other types of metadata such as the channel, actors, ratings, the start and end times, the date and information as to whether the content will be broadcasted at a different time. In the present example, the external recommendation list is the same for each of the user device 22. As will be described below the external recommendation list may be communicated to and modified by the user devices 22.

The recommendation authoring system 34 may be a combination of automated and operator controlled systems. The recommendation authoring system 34 may receive data from various sources including external sources 35 and internal sources 37 available from within the head end. The external sources 35 may, for example, be provided from one or more experts, from Nielsen® ratings, Blue Fin®, or other external sources. An example of internal sources is "What's Hot" which is a list of the most watched and talked about programming available from the system provider associated with the head end 12. The internal sources 37 may also be modified according to various marketing experts within the head end. The compilation of the external sources and internal sources may be performed to obtain the external recommendation list. Both the external sources 35 and internal sources 37 may also generate the related content list. The related content list may also have the same type of metadata associated with the recommended content.

The recommendation authority system 34 may change the content of the external recommendation list converted into a binary format of data files for communication into the user devices. The binary format data file may be included with payload object and communicated to the various user devices. This process will be described in more detail below.

The user devices 22 may be in communication with the head end 12 through a network 36. The network 36 may be one type of network or multiple types of networks. The network 36 may, for example, be a public switched telephone network, the internet, a mobile telephone network or other type of network.

User devices 22 illustrated in FIG. 1 may be interconnected within a household, multi-dwelling unit or commercial building. User devices 22 may be interconnected through a local network (not illustrated) such as a wireless network or a wired network. The interconnection of the user devices 22 may allow for multi-room viewing of content as well as coordinated content recording. That is, content stored on one set top box may be communicated to another set top box through the network.

A mobile device 40 may also be incorporated in the system 10. The mobile device 40 may also receive downlink signals from the satellite 18. The mobile device 40 may also be in communication through a wireless network to the head end 12.

The network 36 may also be in communication with a home media center 50. The home media center 50 is a user receiving device that receives content and stores the content therein. The home media center 50 may also be referred to as a server device. The home media center 50 may be in communication with a plurality of user devices or client devices 52 through a local area network 54. The client devices 52 may be set top boxes, mobile devices or other clients such as an RVU® client. Thus, the home media center 50 may have one central storage device therein. The home media center 50 may be used to distribute content, channels, programs and other data to each of the client devices 52. The home media center 50 may also include an antenna 24 for communicating with the satellite 18 in a similar manner to that illustrated above with respect to the user devices 22. The local area network 54 may be wired or wireless.

Figure 2A:
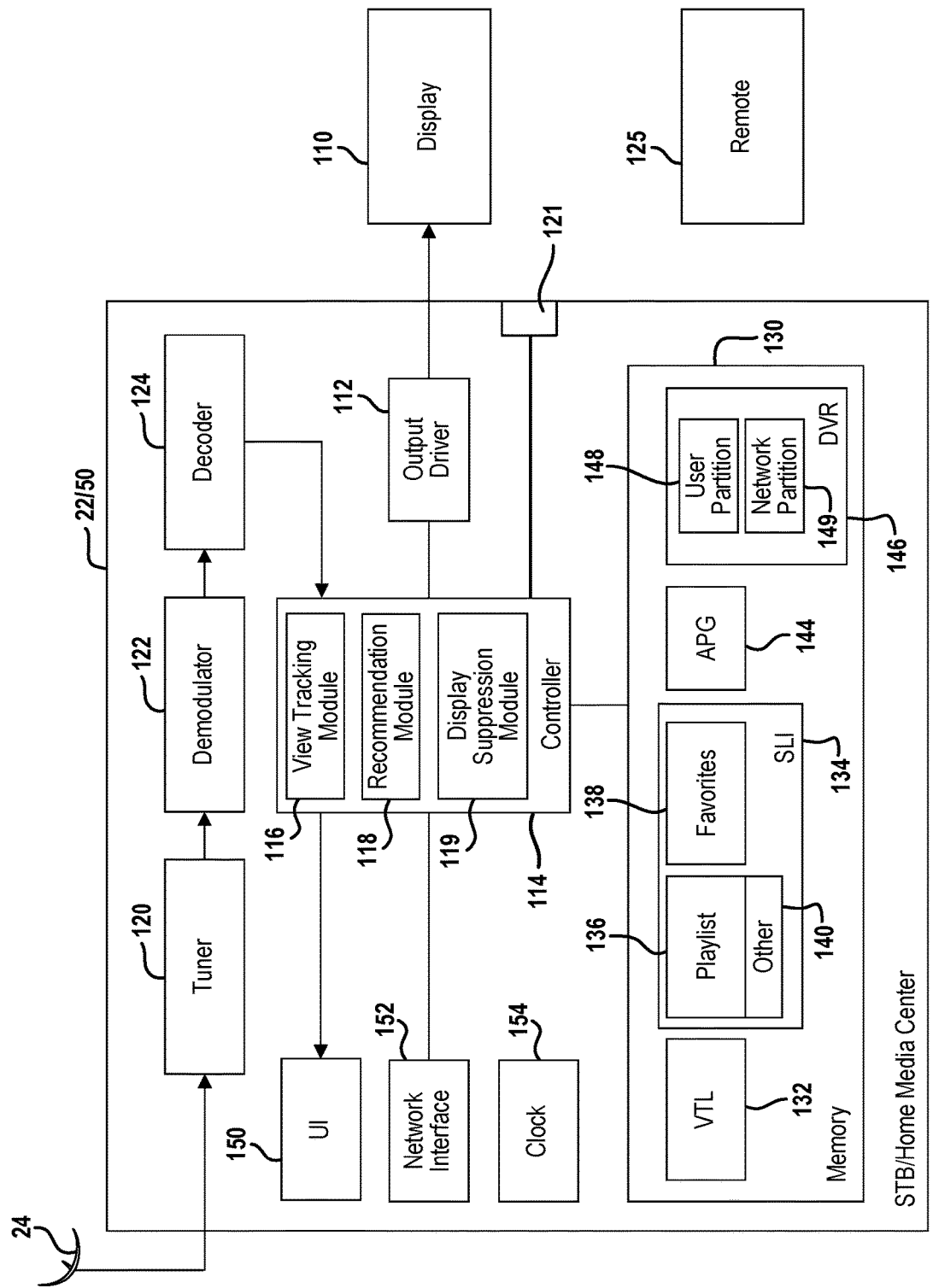
FIG. 2A is a block diagrammatic view of the user receiving device of FIG. 1.
Figure 2B:
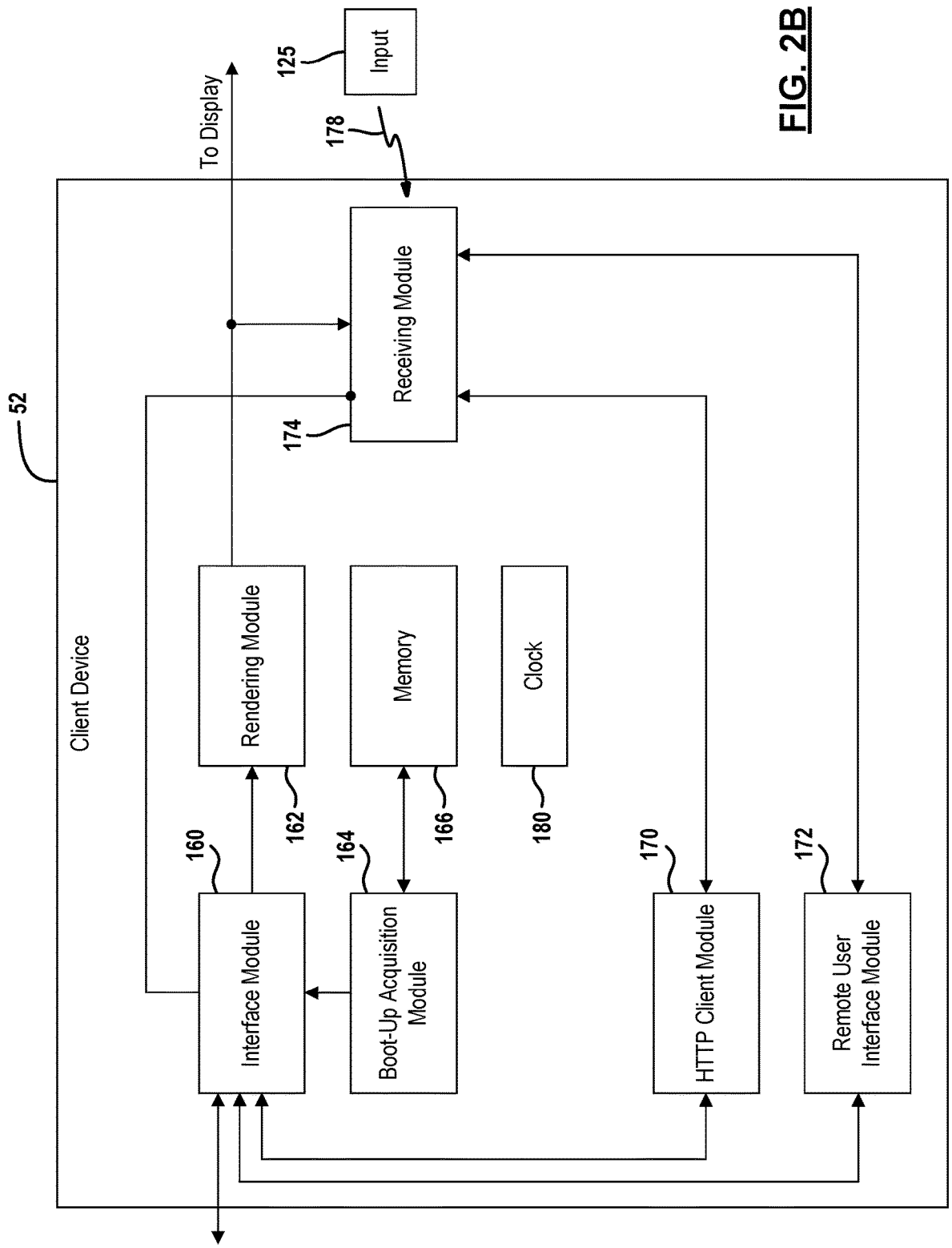
FIG. 2B is a block diagrammatic view of the client device of FIG. 1.

Referring now to FIG. 2, a user device 22, such as a set top box is illustrated in further detail. Although, a particular configuration of the user device 22 is illustrated, it is merely representative of various electronic devices with an internal controller used as a content receiving device. The antenna 24 may be one of a number of different types of antennas that includes one or more low noise blocks. The antenna 24 may be a single antenna 24 used for satellite television reception. The user device 22 may be coupled to a display 110. The display 110 may have an output driver 112 within the user device 22. A mobile device such as that described above may have an omni-directional antenna.

A controller 114 may be a general processor such as a microprocessor that cooperates with control software. The controller 114 may be used to coordinate and control the various functions of the user device 22. These functions may include a tuner 120, a demodulator 122, a decoder 124 such as a forward error correction decoder and any buffer or other functions. The controller 114 may also be used to control the storing of an external recommendations list within the memory of the controller, automatically storing recommended content, storing user requested content in the memory, and comparing selections to already stored content.

The controller 114 may also include a viewer tracking module 116, a recommendation module 118 and a display suppression module 119. The viewer tracking module 116 is used for tracking and logging viewing events at the user receiving device 22/home media center 50. Ultimately, the viewer history may be logged in a viewer tracking log as will be further described below. The viewer tracking module 116 may track a time a content was watched, a client device associated with the content, the title of the content and if the content belongs to a series. The recommendation module 118 is used for generating recommendations corresponding to programs currently available for viewing corresponding to previously watched content during a particular timeslot. The recommendation module 118 may also generate programs or recordings that are deemed to be future or current programming that the viewer should like based on an analysis of viewing habits of the viewer. As will be described below, a content list corresponding to recorded content may be determined in the user receiving device 22/home media center 50. The user receiving device 22/home media center 50 may reorder the recorded content list before communicating the recorded content list to the client device. The recommendations module 118 may receive the external recommendations list. Both types of recommendations will be further described below.

The controller 114 may also include a display suppression module 119. The display suppression module 119 is used to suppress the display of various data. In the present example the data suppressed may include suppressing the recommended content from appearing in the amount of available space within a memory. That is, the capacity of the user device may appear greater than is actually available. For example, a memory space indicator may be displayed on the display 110. Content recorded from the recommended recording list may be stored in the memory 130 without being accounted for therein. This will allow the memory space indicator to indicate to the user that more space is available. The content stored from the recommended recording list may thus be removed or replaced when a user attempts to record user-requested programming therein. The display suppression module 119 may also suppress the display of a recording indicator 121 that that content is being recorded by the user device 22. The recording indicator 121 may be an LED on the external surface of the user device 22 that is illuminated when content is being recorded. The recoding indicator 121 may not be illuminated when content is automatically recorded using the recommended recording list. This will make it appear to a user that the system is fully capable to perform any user-generated requests.

The tuner 120 receives the signal or data from the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller. Although only one tuner 120, one demodulator 122 and one decoder 124 are illustrated, multiple tuners, demodulators and decoders may be provided within a single user device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for various operational data collected during operation of the user device 22. One type of data storage includes the viewer tracking log 132 obtained and controlled by the viewer tracking module 116. The viewer tracking log (VTL) 132 includes viewer tracking log data that includes data about details of programs that have been watched or played back, including what time that they were watched or played back. The data of the VTL 132 may also include how long they were watched and program details. The program details may include whether the program belongs to a series. Recording deletion data within a digital video recorder may also be included in the data of the VTL 132.

Another type of memory 130 is the settings and the list information (SLI) memory 134. The SLI memory 134 may store various types of data including set top box playlist data 136 that has the playlist for content saved within the user device 22. The playlist data contains content visible to users and content currently non-visible to users. Another type of data is the favorite settings for the user device 22. The favorites may be stored in a favorite's memory 138. Other types of data may also be included in the SLI memory 134 which is illustrated as an "other" data memory 140. The other data memory 140 may include various types of data including ignored suggestions which correspond to suggestion or recommendation suggestions that were ignored. Another type of data in the other data memory 140 may include the channel subscription data, the blocked channels, adult channels, rating limits set by the user device 22, current set top box language, prioritizer data, TV resolution data, to do list data, the conditional access module identifier, and a request identifier. The request identifier may be generated at the simulation engine 50 of FIG. 1 as is further described below. Further, time zone data, time of day daylight savings, status data, aspect ratio data, viewing hours data, quick tune list and a zip code may all be included within the other memory 140 of the SLI memory 134.

The memory 130 may also include advanced program guide memory 144. The advanced program guide (APG) memory 144 may store program guide data that is received within the system. The program guide data may store various amounts of data including two or more weeks' worth of program guide data. The program guide data from the APG memory 144 may be communicated in various manners including through the satellite 18 of FIG. 1. The program guide data may include a content or program identifiers, and various data objects corresponding thereto. The content identifier may include series data. The first 4 digits may, for example, identify the series. The program guide may include program characteristics for each program content. The program characteristic may include ratings, categories, actor, director, writer, content identifier and producer data. The data may also include various other settings.

The memory 130 may also include a digital video recorder 146. The digital video recorder 146 may be a hard drive, flash drive, or other memory device. A record of the content stored in the digital video recorder is a playlist. The playlist may be stored in the DVR 146 or a separate memory as illustrated.

The digital video recorder 146 may include a user partition 148 and a network partition 149. The network partition 149 is a portion of the memory used for storing various operating conditions, and to push content that may be provided to the user. Typically the network partition part of the DVR memory 146 is relatively small compared to the user partition 148. The user partition 148 is typically controlled by the user. The user partition 148 is used for storing content requested to be stored by the user. The digital video recorder 146 stores content upon request by the users through various types of interfaces. User requests for recording may also be communicated from a remote system. The user partition 148 as will be described further below, may be used for storing content from the recommended recording list without interaction with the user. That is, content may be automatically stored within the user partition 148 as determined by the recommended recording list. This content may have an extremely low priority and thus the user may overwrite the contents automatically stored within the memory. As mentioned above, the display suppression module 119 may suppress at least a portion of the displays. The display suppression module 119 may suppress the content stored in response to the recommended recording list within the user partition 148 so that the user partition does not appear to be fuller than the recordings requested by the user. This process will be described in further detail below.

The user device 22 may also include a user interface 150. The user interface 150 may be various types of user interfaces such as a keyboard, push buttons, a touch screen, a voice activated interface or the like. The user interface 150 may be used to select a channel, select various information, change the volume, change the display appearance, or other functions. The user interface 150 may also be used for selecting recommendation and providing feedback for recommendations as will be described below. The user interface 150 may thus be used for generating a selection signal.

A network interface 152 may be included within the user device 22 to communicate various data through the network 36 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP).

The set top box/home media center 50 may also include a clock 154. The clock 154 may be used to keep track of a current time. The current time may be used to determine a current time slot as described below. The current time may also be used to identify the times at which content is being viewed. In a sense, the current time may be used as a time stamp for data corresponding to the use or watching of various content.

Referring now to FIG. 2A, a client device 52 is illustrated in further detail. The client device 52 may include various component modules for use within the local area network 54 and for displaying signals. The display of signals may take place by rendering signals provided from the network. It should be noted that the client device 52 may comprise various different types of devices or may be incorporated into various types of devices. For example, the client device 52 may be a standalone device that is used to intercommunicate through a local area network to the set top box 22/home media center 50 illustrated in FIG. 1. The client device 52 may also be incorporated into various types of devices such as a television, a video gaming system, a hand-held device such as a phone or personal media player, a computer, or any other type of device capable of being networked.

The client device 52 may include various component modules such as those illustrated below. It should be noted that some of the components may be optional components depending on the desired capabilities of the client device and fixed user system. The client device 52 includes an interface module 160. The interface module 160 may control communication between the local area network and the client device 52. As mentioned above, the client device 52 may be integrated within various types of devices or may be a standalone device. The interface module 160 communicates with a rendering module 162. The rendering module 162 receives formatted signals through the local area network that are to be displayed on the display. The rendering module 162 merely places pixels in locations as instructed by the formatted signals. Rendering may also take place using vector graphics commands that instruct a group of pixels to be formed by the client based on simple instructions. By not including a decoder, the rendering module 162 will allow consistent customer experiences at various client devices. The rendering module 162 communicates rendered signals to the display of the device or an external display. The rendered signals may include but are not limited to a program guide and guide banners or row ads associated therewith, a playlist, a pay-per-view list, and a recommendations list. A recommendation list may contain recommended programs or movies or both. Recommended lists may also include a content or movies that are stored within the set top box 22/home media center 50.

A boot-up acquisition module 164 may provide signals through the interface module 160 during boot-up of the client device 52. The boot-up acquisition module 164 may provide various data that is stored in memory 166 through the interface module 160. The boot-up acquisition module 164 may provide a make identifier, a model identifier, a hardware revision identifier, a major software revision, and a minor software revision identifier. Also, a download location for the server device to download a boot image may also be provided. A unique client device identifier for each client device may also be provided. The set top box 22/home media center 50 may receive the client device identifier in communication signals from each client device. The client device identifier may be used in various communications between the client device and the set top box 22/home media center 50. For example, when requesting a playlist, a pay-per-view list, a set top box guide, a movie list or recommendations, the request may come with a client device identifier so that the particular client device may be identified by the set top box 22/home media center 50. Also, when viewing requests, such as channel tuning, content selection and the like are performed, the client device identifier may be communicated from the client device. The set top box 22/home media center 50 may correlate the watched content and the client device so that recommendations, ordered playlists, pay-per-view list, guide banners and movie recommendations may be personalized for the various client devices. The boot-up acquisition module 164 may obtain each of the above-mentioned data from memory 166.

Communications may take place using HTTP client module 170. The HTTP client module 170 may provide formatted HTTP signals to and from the interface module 1600.

A remote user interface module 172 allows clients associated with the home media center 50 to communicate remote control commands and status to the server device. The remote user interface module 172 may be in communication with the receiving module 336. The receiving module 174 may receive the signals from a remote control or input 125 (FIG. 2A) through input signal 178 associated with the display and convert them to a form usable by the remote user interface module 172. The remote user interface module 172 allows the server device to send graphics and audio and video to provide a full featured user interface within the client. Screen displays may be generated based on the signals from the server device. Thus, the remote user interface module 172 may also receive data through the interface module 160. It should be noted that modules such as the rendering module 162 and the remote user interface module 172 may communicate and render both audio and visual signals. The receiving module 174 may receive input signals from the input 125. The input 125 may be a visual input signal that may include, but is not limited to, a graphical input signal such as a stylus signal or a gesture signal, a mouse signal, or a pointer signal.

The data received through the receiving module 174 may be communicated directly to the interface module 160 and ultimately the server device with very little processing because very little processing power may be included within a client device 52. The receiving module 166 may convert the signals input into electrical signals for transmission or communication to the server device. For example, the raw voice signals may be communicated to the server device through the interface module 160.

A clock 180 may communicate with various devices within the system so that the signals and the communications between the server device and client are synchronized and controlled.

Figure 3:
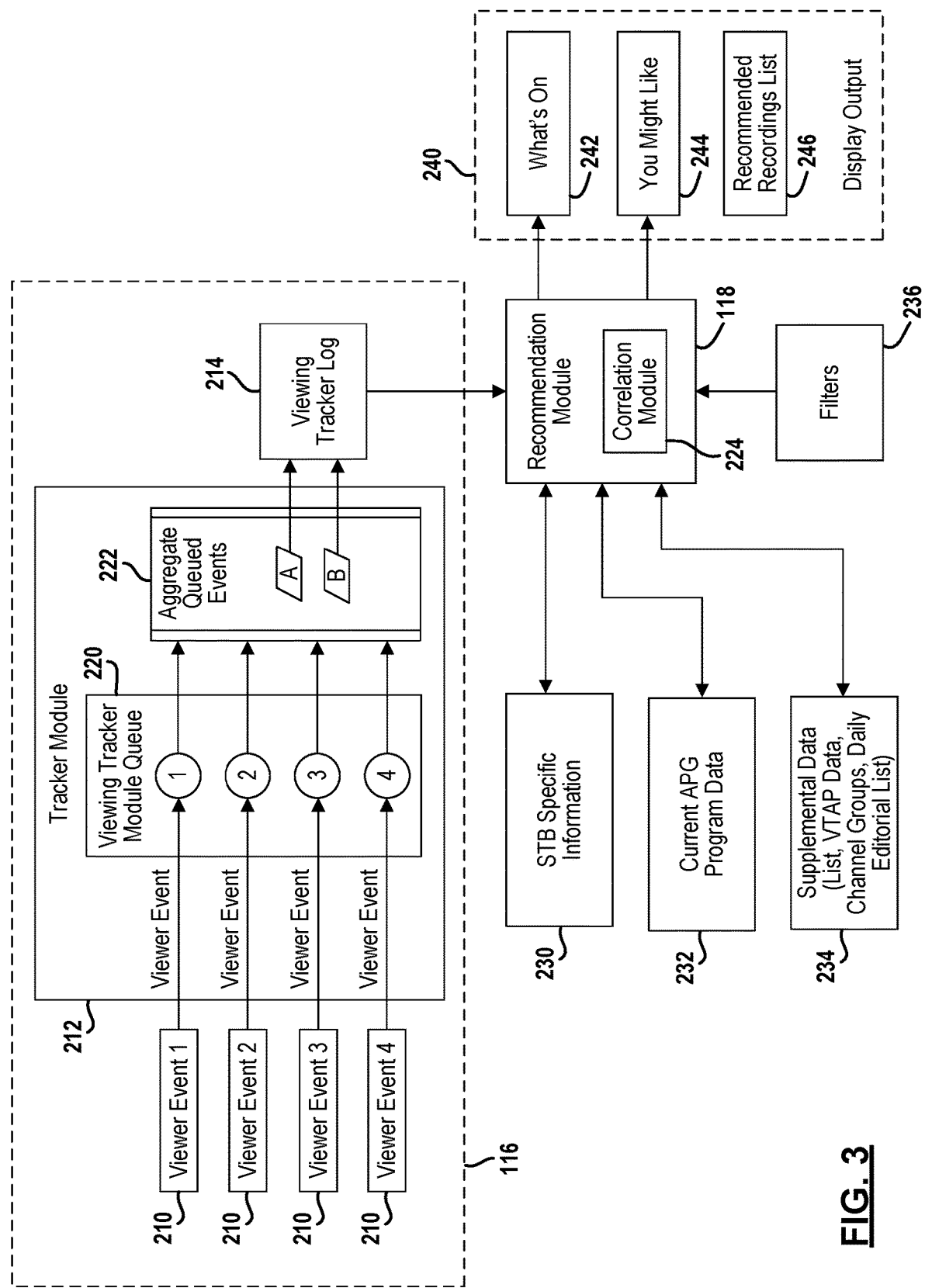
FIG. 3 is a simplified block diagrammatic view of the recommendations module according to the present disclosure.

Referring now to FIG. 3, the recommendation module 118 and its inter-connections are illustrated in further detail. The recommendation module 118 is in communication with the viewer tracking module 116. The viewer tracking module 116 includes a viewer events module 210 which is in communication with a tracker module 212 which in turn is in communication with a viewing tracker log 214. The viewing tracker log 214 may ultimately be stored in the memory of the user device as illustrated in FIG. 2. A most viewed programming list may be stored in the viewing tracker log 214.

The viewer events module 210 generates data corresponding to viewing events so that the recommendation module 118 is able to generate useful recommendations likely to be of interest to the user. Various viewing events may include tuning to live television events, playing back recordings, channel changes and trickplay changes. Trickplay changes may include various digital video recorder functions including skipping various content during playback, or other digital video recorder functions.

The live viewing events may only be logged after a predetermined amount of time has passed while viewing a channel. A live viewing event may therefore have a time the tuning change occurred (which is the time the event was generated minus the 30-second waiting period), the channel object of the channel tuned and a program object of the program currently airing. Other information in the live viewing data may include a dual-live buffer swap.

A live television viewing event may also be generated when the current program ends and another begins in order to note the change of the program object identifier. In such a case, the event may be immediately generated with no 30-second lag between the change and the generation of the event.

A playback viewing event may also be logged. The playback of a program from a digital video recorder may be a playback viewing event. The time the playback began (which is the time the event was generated minus the 30-second waiting period), the channel object of the channel that the recording was recorded from and the program object of the recording may all be recorded.

A channel change may also be logged by the viewer events module 210. If the viewer changes the channel that is currently being viewed live, a channel change event may be logged. The time the channel was changed, the original channel and the destination channel may be logged.

Trickplay changes may also be monitored. If a trickplay is performed and no other trickplays are performed within a predetermined amount of time, the trickplay event may be logged. The time the trickplay change occurs, the location that the trickplay occurs within the recording and the new trickplay state may all be logged.

An idle-mode change may also be logged. That is, if the set top box or user device goes into an idle mode or comes out of an idle mode, an idle mode change event may be logged. The time the idle mode change occurred, a flag indicating whether the user device is entering or exiting an idle mode and a flag indicating whether the idle mode is actually stand-by, may all be logged.

An audio change is another viewer event that may be logged. If the viewer changes audio on the currently-tuned channel or in a recording, then an audio change event may be logged. The time the audio change occurred, a new audio stream identifier and an audio stream language may all be logged.

The viewer event module 210 may also log whether a recording has been deleted. If a recording has been deleted from the digital video recorder, a recording deleted event may be logged. The recording deleted event may include the time the recording was deleted, the channel object of the channel that the recording being deleted was from, the program object of the recording deleted and the reason the recording was deleted such as an explicit viewer deletion, a recording expiration, no room on the hard drive or the like.

The viewer event module 210 may also log a user device identifier associated with each of the events described above. The viewer event module 210 may ultimately provide a view tracking log 214 for each of the various user devices. The user device identifier may be a client device identifier. The user device identifier may also correspond to a server or user receiving device identifier. In a home media application, a display is typically associated with the user receiving device 22 or home media center 50 itself. In one constructed embodiment, four client devices may each have separate client device identifiers and separate displays for display content. The home media center 50 may also include a display for displaying content. Therefore, the various events may correspond to various user devices. As will be described below, ultimately recommendations may be reordered based upon the user device requesting a recorded content list.

The various types of events mentioned above may be used to generate a most viewed programming list. The most viewed programming list may include the most viewed series from the various types of viewing events such as live television, playback viewing, channel changes and quick play and the like. The series within the most viewed programming list may ultimately be used to generate a recommended recording list. The recommended recording list may be generated from a correlation of the most viewed programming list and the external recommendation list within the correlation module 224. In one example that will be described more below, the correlation module 224 may review the external recommendation but to determine if any series on the most viewed programming list are on the external recommendation list. Matching content may be used to form the recommended wordings list 246. As mentioned above, the recommended recording list may be reordered based upon a user device identifier or a time slot corresponding to the request, or both.

The viewer events from the viewer events module 210 are communicated to the tracker module 212 which gathers the viewer events, analyzes them and based on the analysis adds the entries to the viewer tracking log 214. The viewer tracking log 214 may include the watched programs and recordings deleted.

The tracker module 212 may include a viewing tracker module queue 220 that queues the various viewer events. An aggregate queued events module 222 may aggregate the queued events and store them within the viewing tracker log 214.

The viewer tracking module 116 may be specific to one user device in a system such as a networked system illustrated in FIG. 1. The home media center 50 may keep track of data individually for each client. The home media center 50 could also be configured to aggregate data such as most channels watched, the viewer tracking log and other data.

The recommendation module 118 may also be in communication with set top box specific information 230 including the playlist and the channels subscribed to. These may be referred to as "channels I get."

The recommendation module 118 may also be in communication with the current program guide data 232. The program guide data 232 corresponds to the currently available programs provided by the head end.

The recommendation module 118 may also be in communication with supplemental guide data 234. The data 234 corresponds to various data objects that may be sent together with the program guide data. The supplemental guide data 234 may include channels recommended. The recommended channels may be recommended by a person or determined by machine. The channels recommended may be communicated from the head end 12 as a data object to the user device 22. The recommended channels may be in a list from most recommended to least recommended.

Outside sources may also provide data. Outside sources may include sources that provide recommended programs. For example, programs may be recommended based upon a selection. Thus, all recommended programs related to a selected program may be provided. A list of related television series related to a selected television series may also be provided. The recommendations may be performed based upon various object data. The supplemental data may also include a channel group which groups channels together. For example, related channels may be grouped together based upon content typically played at such channels. A daily editorial list may also provide data selected by a person or a machine for a particular time period. For example, if a certain sporting event such as the Super Bowl will be played that day, this may be included within the daily editorial list. Other special events for a particular day may also be included within the daily editorial list. The daily editorial list is an example of an external recommendation list.

A filter module 236 for filtering available content may also be used. The filter module 236 may include the watched program ratings, channel locks, adult content filters or other user selectable filters. The filters prevent content titles from appearing in the recommendations lists.

The recommendation module 118 may generate an output to a display 240. The output is a recommendations list having titles, poster or other identifiers of content that may be desirable for the user. In the present example a first recommendation list and a second recommendation list is displayed simultaneously. Each list is generated using a different method. The display 240 may include a What's On display 242 as the first recommendation list and a You Might Like display 244 as the second recommendation list. The output may be in graphical, alphanumeric, or a combination of graphical and alphanumeric identifiers. These passages will be further described below.

Another type of list may also be generated such as a recommended recordings list 246. The recommended recordings list 246 may replace the You Might Like list 244 if the user opts into this feature. The recommended recordings list 246 may display recommended recordings recorded within the user partition of the digital video recorder. This content will be available without delay so that downloading delays are not experienced by the user. In one example, the What's On recommendation list 242 for items that are currently being broadcasted may be displayed on a split screen with the recommended recordings list 246. Of course, the first few items of the What's On list and recorded recommendation list 246 may be displayed. If the user through the use of a user interface requires further contents on the list the contents may be scrolled as will be described further below.

Figure 4:
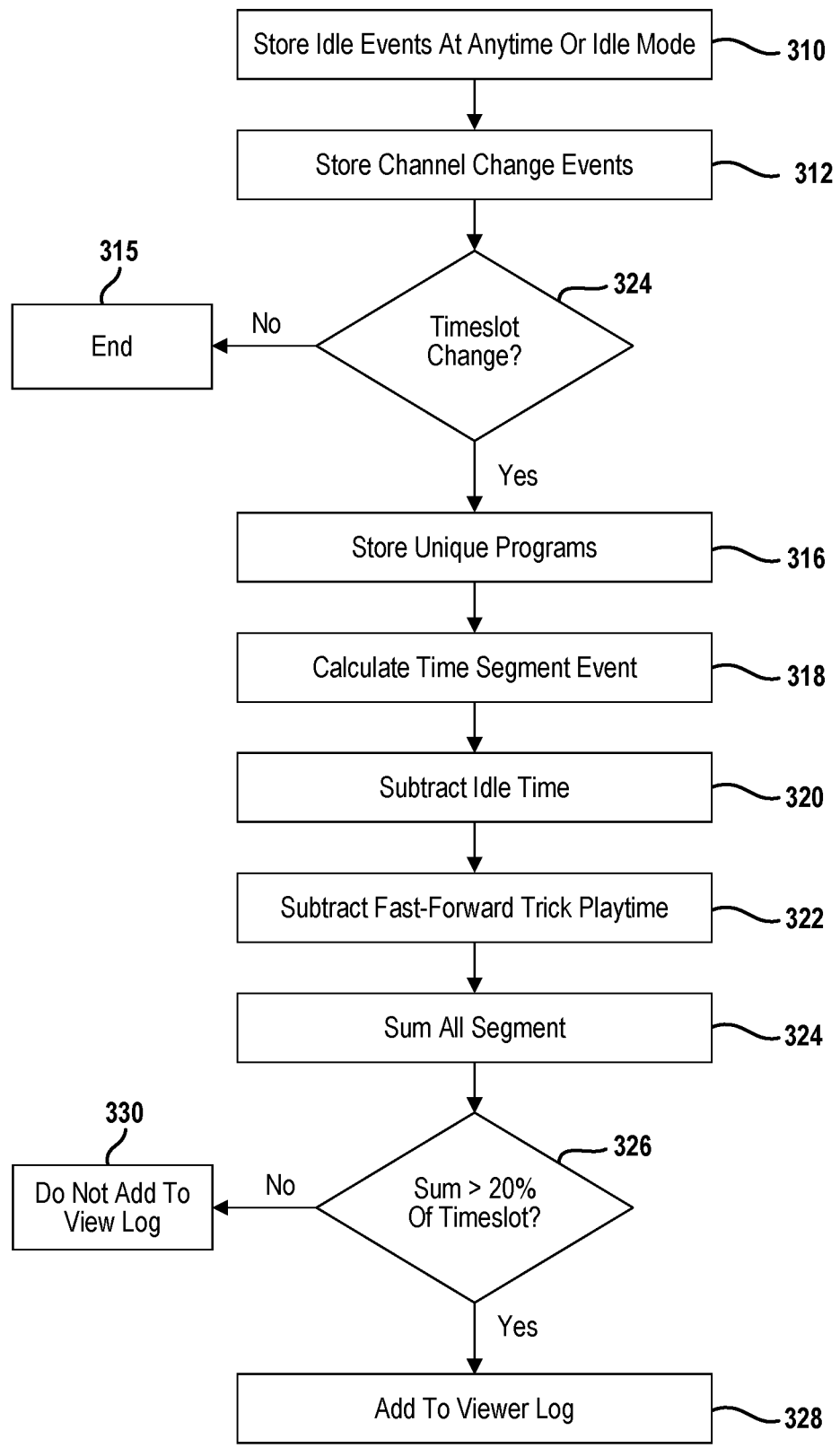
FIG. 4 is a flowchart of a method for forming a viewer tracking log.

Referring now to FIG. 4, a method for determining whether a program was watched live or a recording was watched is set forth. In step 310, the idle mode change events are stored. Further, whether the user device is in an idle mode is stored. In step 312, channel change events are stored. In step 314, it is determined whether a timeslot has been changed. If a timeslot has changed in step 314, the unique programs are stored in step 316. After step 316, the total time watched for each program is stored. This may be performed by calculating the time a segment of a program was watched by calculating the delta from the time of a live television viewing or playback viewing event at the time of the next live television viewing or playback event or the time of the next channel change event. This is performed in step 318. In step 320, the time that the set top box was in idle mode is subtracted from each segment in step 320. In step 322, any fast-forward trickplay modes are also subtracted.

In step 324, all the segments of the same program are summed together. In step 326, not all of the events may be stored in a viewer log. This reduces the size of the viewer log to a manageable size. In this case, 20% of a timeslot is used. Thus, if the sum of all the segments in a timeslot is greater than 20% of the timeslot in step 326, the viewer event is added to the viewer log in step 328. In this case, a timeslot may be 30 minutes and thus the 20% corresponds to six minutes. Of course, other times may be used. The 20% is merely used as a non-limiting example. In step 326, if the sum of all the program segments does not total 20%, then step 330 does not add the program to the viewer log.

A timeslot is a predefined time period having a start time and an end time. For example, a timeslot may be 7:00 p.m. to 7:30 p.m. If the present time is 7:15 p.m., 7:00 to 7:30 p.m. is the current timeslot and 7:30 p.m. to 8:00 p.m. is the next timeslot.

Figure 5:
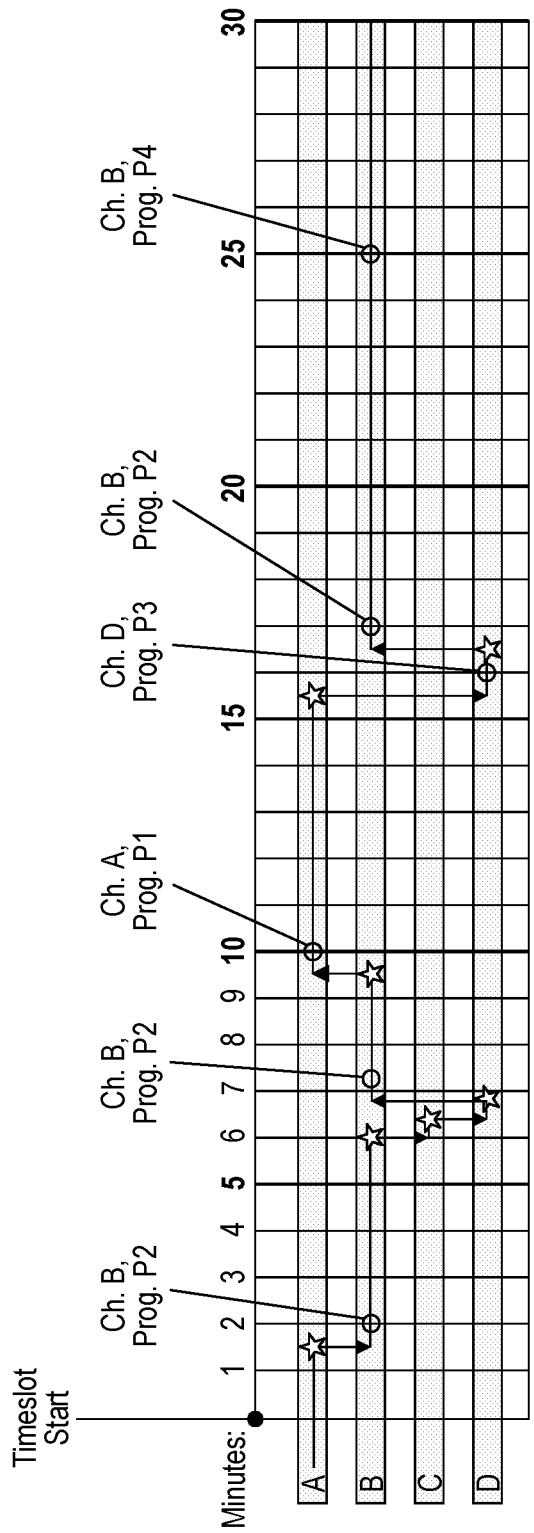
FIG. 5 is a channel versus time plot of channel changes for an example of a user device operating.

Referring now to FIG. 5, an example of a channel usage event during a timeslot is set forth. This table refers to events at one user device. In this example, the timeslot is 30 minutes. However, various other timeslots may be used. The timeslot for a recording may be different than a live event such as 60 minutes. In this example, four channels A, B, C, D are used. For the first segment between 0 and 1.5 minutes, channel A or program P1 is watched. In the second segment, channel B is tuned to program 2 (P2). The second segment continues from 1.5 minutes through 6 minutes. The channel is then changed to channel C, then to channel D, then back to channel B. This occurs between minutes 6 and 7. Between minutes 7 and 9.5, channel B program P2 is tuned. At time 9.5 minutes, the channel is tuned to program A until 15.5 minutes. At 15.5 minutes, channel D, program P3 was watched for one minute. The channel was then returned to channel B program 2 until 25 minutes. At the 25-minute time period, channel B switched programs to program P4.

Referring now to FIG. 6, the viewer tracking module receives the event set forth in the table illustrated therein. The live tuning events set forth in the table are limited by the threshold period. The tuning to channels C and D at the 6-minute mark do not result in a live television tuning event since their period is shorter than the 30-second time threshold. The tuning event at channel B at the 25-minute mark with no channel change occurs because the program changed from program P2 to program P4.

Referring now to FIG. 7, a channel tune time calculation table is illustrated. The programs are sorted and the viewer tracking log obtains the data within the table. From this table, it can be determined that program P1 was watched for 7 minutes and 30 seconds total. Program P2 on channel B was watched for 15 minutes and 45 seconds while program P3 on channel D was watched for 1 minute and program P4 on channel B was watched for 5 minutes. The programs P3 and P4 do not meet the minimum 6-minute time and thus will be discarded in the viewer tracking log. Consequently, program P1 on channel A will be logged for 7 minutes and 30 second and program P2 on channel B will be logged for 15 minutes and 45 seconds in the viewer tracker log.

Figure 8:
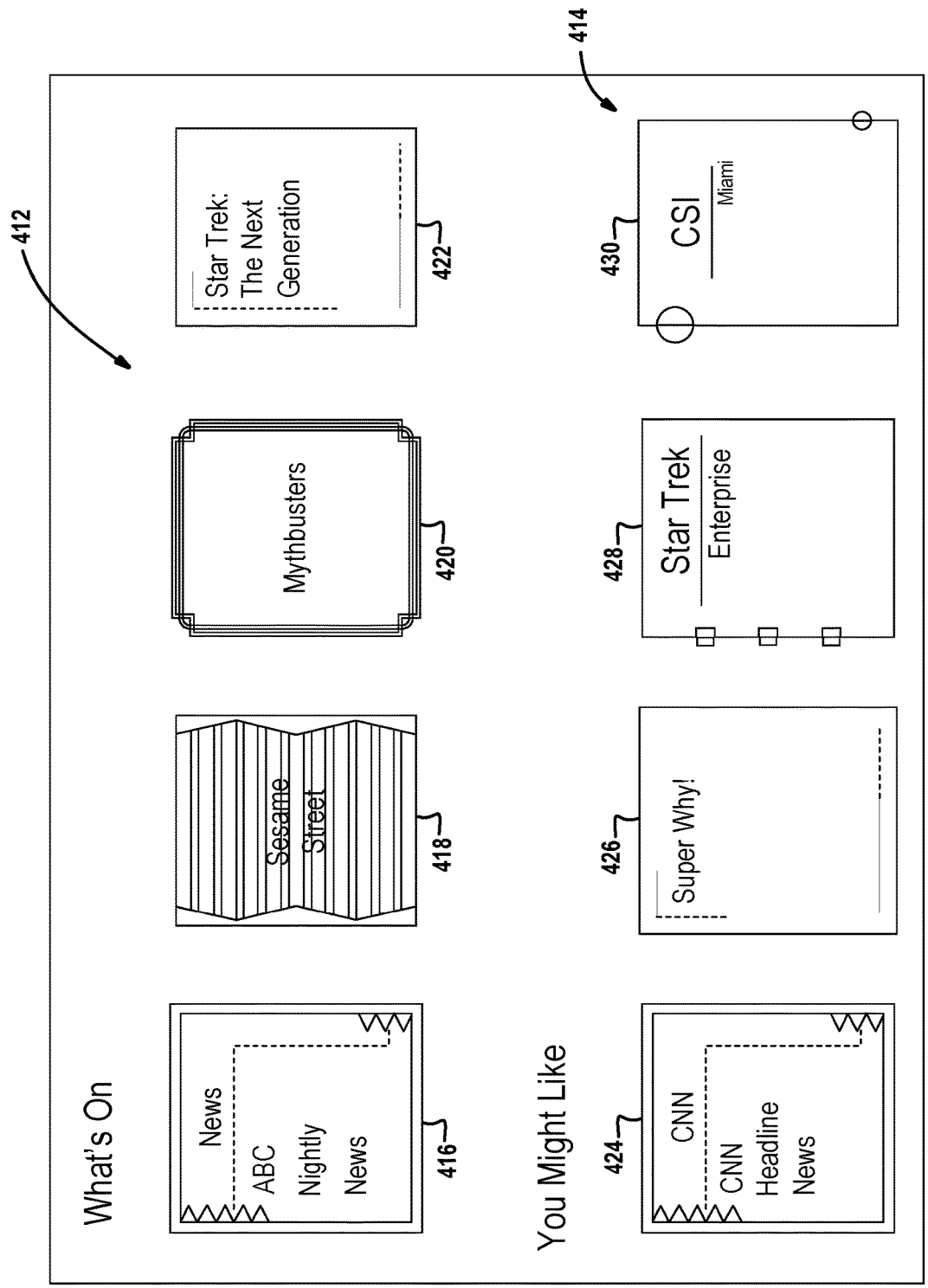
FIG. 8 is a simplified view of recommendations provided by the recommendations engine for a What's On portion and a You Might Like portion.

Referring now to FIG. 8, one example of the recommendation process results is a recommendation screen 410 which is broken down into a What's On portion 412 and a You Might Like portion 414. The What's On program list has program content titles for programs that are regularly watched during a current timeslot. The program content in the What's On list is content that is currently being broadcast. The What's On list may include a plurality of thumbnails for 416, 418, 420, and 422. An alphanumeric list may also be provided in addition to or in place of the thumbnails. The television or display associated with the set top box may be directly tuned by selecting one of the thumbnails 416-422 using the user interface.

The You Might Like portion 414 lists recommendations for the viewer. The You Might Like portions are programs that are not regularly watched by users. The You Might Like recommendations can be available now or in future. A plurality of thumbnails 424-430 is provided. The thumbnails 424-430 displayed in the You Might Like portion 414 correspond to recommendations from the recommendation engine.

The viewer-tracking and recommendation algorithms described herein operate in the satellite-connected set top box with or without a network connection or feedback from the set top box to the head-end. Feedback may be provided from broadband-connected set top box users, to enable PC or mobile users to log in to their account and view their recommendations. The feedback may also allow analysis and improvement of the performance of the recommendation algorithms.

Figure 9:
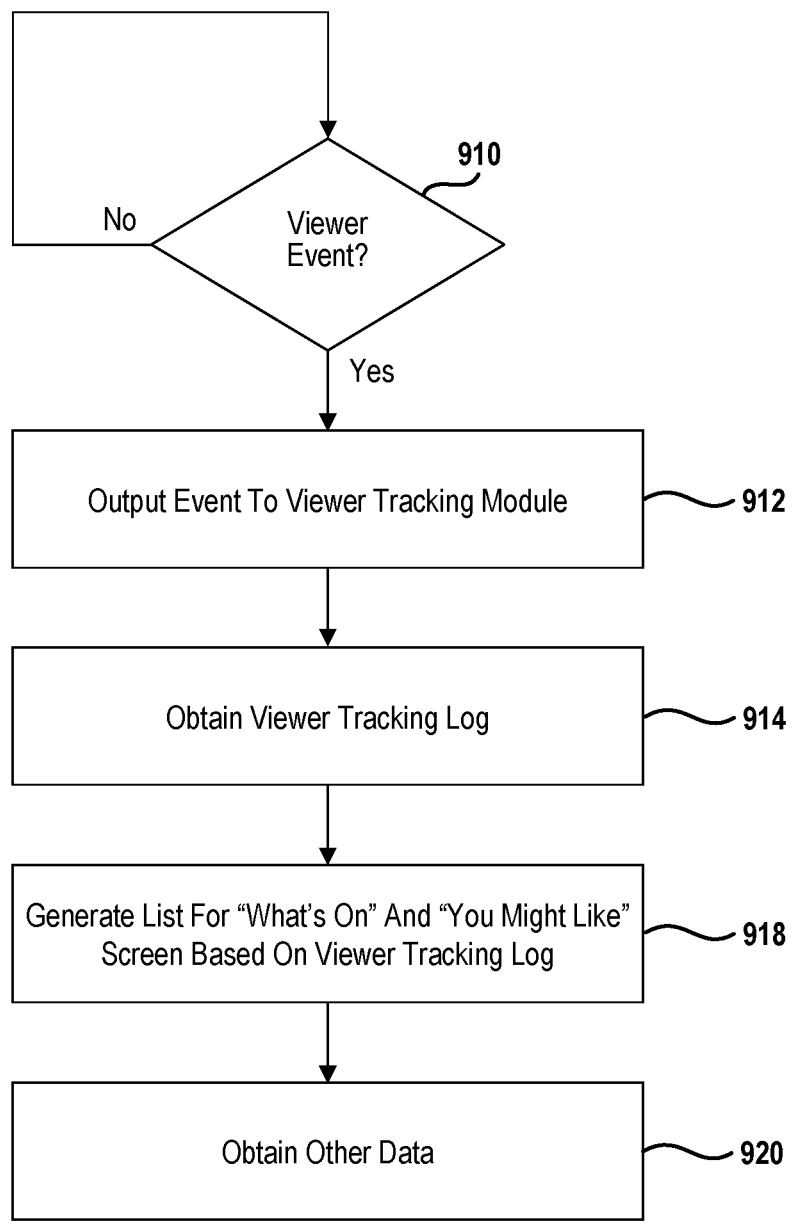
FIG. 9 is a flowchart of a simplified method for generating the What's On list and the You Might Like list.

Referring now to FIG. 9, a high-level flowchart of the process is set forth. In step 910, when a viewer event is generated, step 912 outputs the viewer event to the viewer tracking module. From the viewer tracking module, a tracking log is generated in step 914. In step 918, a list of recommendations for the What's On and the You Might Like screen displays based upon the viewer tracking log is obtained. In step 920, other data is obtained by the system to populate the What's On and the You Might Like screen display. Further details of this method are set forth below.

Figure 10:
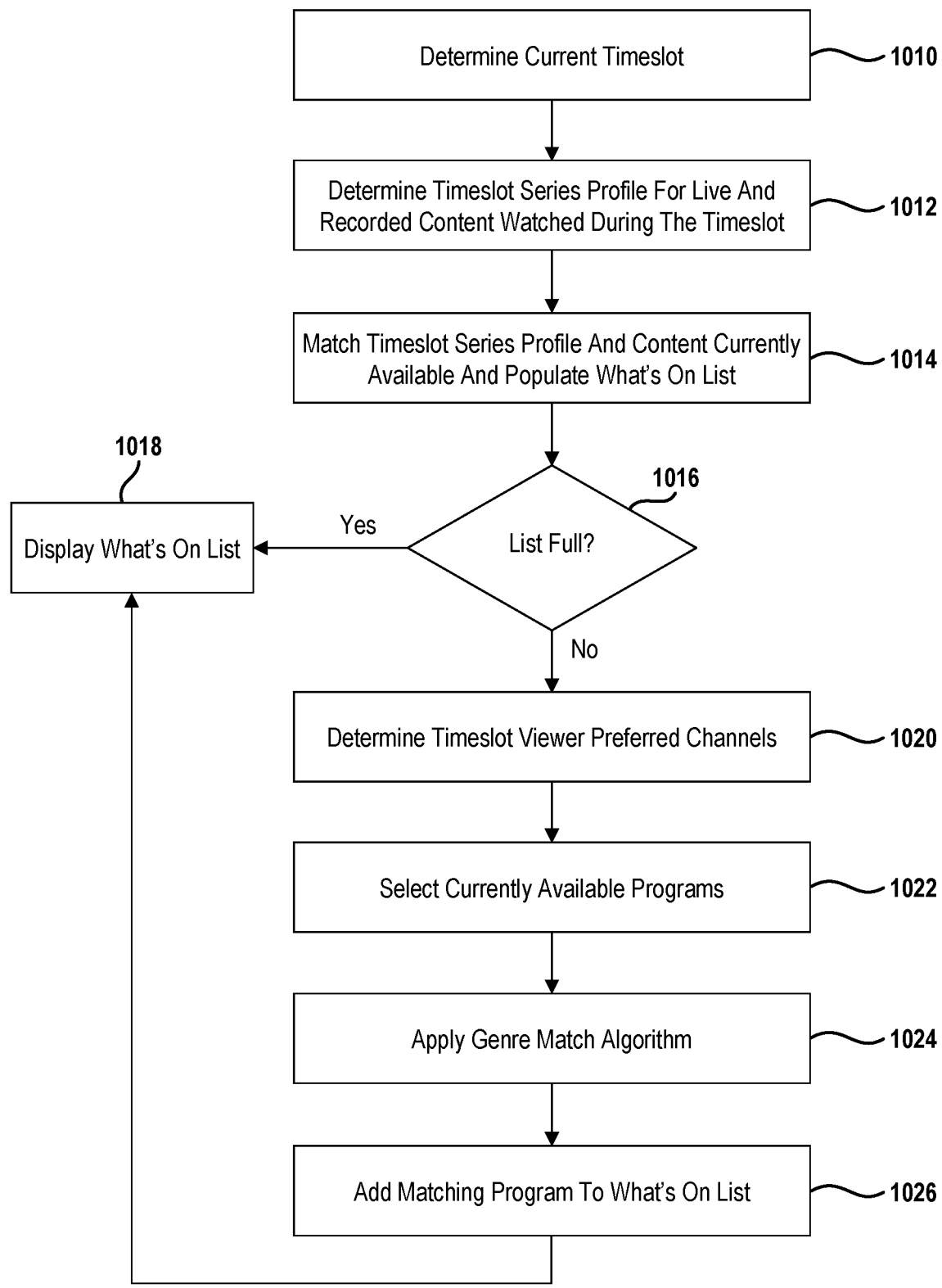
FIG. 10 is a flowchart of a method for generating a What's On list.

Referring now to FIG. 10, a method for generating the What's On list of recommendations at the recommendation engine is set forth. In general, the method uses viewing habits at the user device to provide appropriate recommendations. As will be described below, when the viewing habits do not provide enough information to fill up a list, other sources of data may be used.

In step 1010, a current timeslot is determined. A current timeslot is determined in order to analyze the programs and channels normally viewed at that time of day or day of week. The current timeslot is used to generate recommendations that are relevant to the viewers that normally view television at that time of day or week. A current timeslot enables recommendations to be generated for a shared television based on different viewers and different viewing habits at different timeslots. Determining the current timeslot will be further set forth below. In general, the current timeslot for the present example is 30 minutes. Thus, data will be analyzed for the current 30-minute timeslot. The next timeslot may also be used depending on the relative time within the timeslot. The choosing of the timeslot will be described further in FIG. 12.

In step 1012, a timeslot viewing profile generation algorithm is used to define a timeslot viewing profile for programs viewed live and for recordings played back during the current timeslot. The timeslot viewing profile may identify a program series. In such a case, the profile may be referred to as a timeslot series profile. A series is a program title that has multiple episodes. Traditionally, a series runs consecutive weeks on a network. Although many networks offer repeats of various times. Again, the timeslot series will be described further below in FIG. 15. It should be noted that the timeslot for playback recordings versus live television may be different. For example, live recordings may have 30-minute timeslots while live recordings may have 60-minute timeslots. Of course, the timeslots may both be the same. The timeslot series profile may return a plurality of content titles for series most watched within a timeslot. In step 1014, the timeslot viewing profile is matched against currently available content in the program guide. The series identifier in the content identifier may be compared to a series identifier of available content in the program guide. The list obtained during matching is used to populate the What's On list.

In step 1016, it is determined whether or not the What's On list is full. If the What's On list is full in step 1018, the list is displayed. As described above, the list may be displayed in a thumbnail, a poster, an alphanumeric display, or combination thereof.

Referring back to step 1016, if the list is not full, additional recommendations for the list may be obtained. In step 1020, a timeslot viewer preferred channels list may be developed. The timeslot viewer preferred channels list returns a list of preferred channels or typical channels watched during the timeslot of interest. The list provides a score or ranking value for each channel to provide a relative indication of importance or usage. More popular channels will be ranked higher. In step 1022 select the current programs from the timeslot viewer preferred channels list. In step 1024, a genre match algorithm based upon the viewer preferred program genres may be used to provide a score or ranking for programs from available content on the viewer preferred channels in the timeslot that match the typical genre. Higher ranked channels will be matched first. In step 1026, the highest ranking program matches are added to the What's On list. After step 1026, the What's On list is displayed on a display associated with a user device. The timeslot viewer preferred channels and genre-matching algorithm will be described further below in FIGS. 13 and 17, respectively.

It should be noted that the algorithm for generating the What's On list may have the contents filtered. That is, parental settings or rating settings may be set by the user at the user device. That is, adult content may not be added to the list if adult content is to be excluded. Likewise, content ratings higher than PG 13 may also not be added to the list. Thus, at any point during the process, filters may be used to prevent content from being added to the What's On list.

Figure 11:
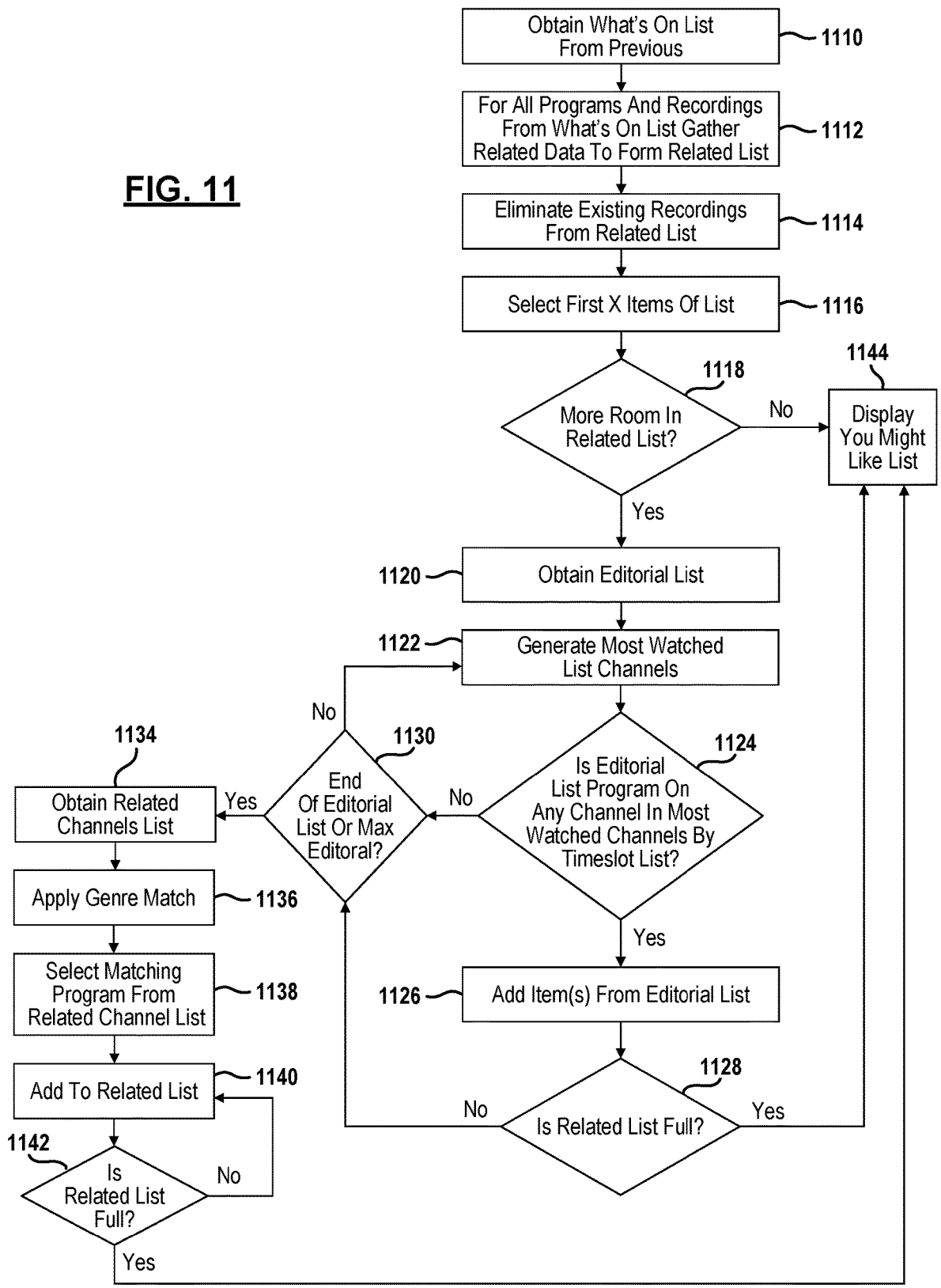
FIG. 11 is a flowchart of a method for generating a You Might Like list.

Referring now to FIG. 11, a method for generating the You Might Like list of recommendations are set forth. In step 1110, the What's On list from FIG. 10 is obtained. Thus, the What's On list provided from steps 1010-1014 are used. Should additional features from steps 1020-1026 be inserted into the list, these may be added. In step 1112, similar programs to those found in the What's On list are generated. Similar programming may be found using metadata or other types of data delivered from the head end, as will be described below. The related program data may be provided with the programming guide data. For example, data for related programs may be included in extended program objects of the program guide data. The related program data may be automatically generated or inserted at various systems including the head end. The related program data may be received from external data sources. The related program data is such that when a viewer watches a program (either live or recorded), the related program data may be used as one of the factors in predicting other programs content that the viewer might like. Related programs are determined in step 1112 for both recorded programs and those in the What's On list from FIG. 10.

In step 1114, related program titles that are already stored in the user device are eliminated. That is, the content identifier or program object identifier may be used to sort through the related list and eliminate identical content. In step 1116, the first X number of content titles from the reduced list may be used for the You Might Like list. The value X may be chosen as 2 in the present example. However, various numbers of related contents may be chosen.

In step 1118, if there is more space in the related or You Might Like list, step 1120 is performed which obtains an editorial list. The editorial list is a list of content titles that may be set forth for a timeslot or other time period. The head end or external source may generate the list. The list may be a ranked list so the higher ranked content titles are compared first. In step 1122, a most watched channels list is generated. In step 1124, the editorial list is compared to the most watched channels list. That is, if any of the editorial list programs are on the most watched channels, step 1126 adds the program title or content identifier from the editorial list to the related or You Might Like list. The editorial list may also include a target channels list with each content title such that the title may also be added if any of the target channels is on the most watched channels list. The editorial list may also include a list of related programs or series with each content title such that the title may be added if any of the related programs or series matches a regularly watched program or series in the timeslot viewing profile generated in step 1012. The editorial list may also include a universal editorial content title, such that the title may be added for all viewers in a timeslot without checking their most watched channels list. The process in steps 1124-1126 is repeated until there is no more room in the You Might Like list or the related list, or the maximum number of daily editorial list programs has been added. Step 1128 determines whether the related or You Might Like list is full. If the list is not full, step 1130 determines whether the end of the editorial list or the maximum number of editorial items has been added to the list. In one example, only two editorial list matches may be added to the related or You Might Like list.

When the end of the editorial list or the maximum editorial entries has not been reached in step 1130, step 1122 is again performed. When the end of the editorial list or the maximum editorial entries has been added to the related list in step 1130, step 1134 seeks to add more content to the related or You Might Like list. Genre-matching may be used to obtain further items for the related or You Might Like list. In step 1134, a related channels list is obtained. In step 1136, genre-matching may be applied to the upcoming programs on the related channels. Genre-matching may be performed for the current timeslot as well as a future timeslot. In step 1138, a list of matching programs from the related channels list is obtained. Values may be obtained for the genre-matching of these programs. When a content title has a highest genre match value or exceeds a minimum threshold corresponding to the highest likelihood of a match, step 1140 adds the content title to the related list. The closeness value is described below. If the related list is not full in step 1142, step 1140 may add another content from the genre-matched related channels list. When the related or You Might Like list is obtained, step 1144 displays the You Might Like list with the various content titles. The You Might Like list has a content identifier, a channel identifier and a program identifier associated therewith. However, only a thumbnail or alphanumeric descriptor may be displayed. The display may also be formed after steps 1118 and 1128 are performed. That is, after there is no more room in the related list in step 1118 or the related list is full in step 1128, step 1144 is performed.

Figure 12:
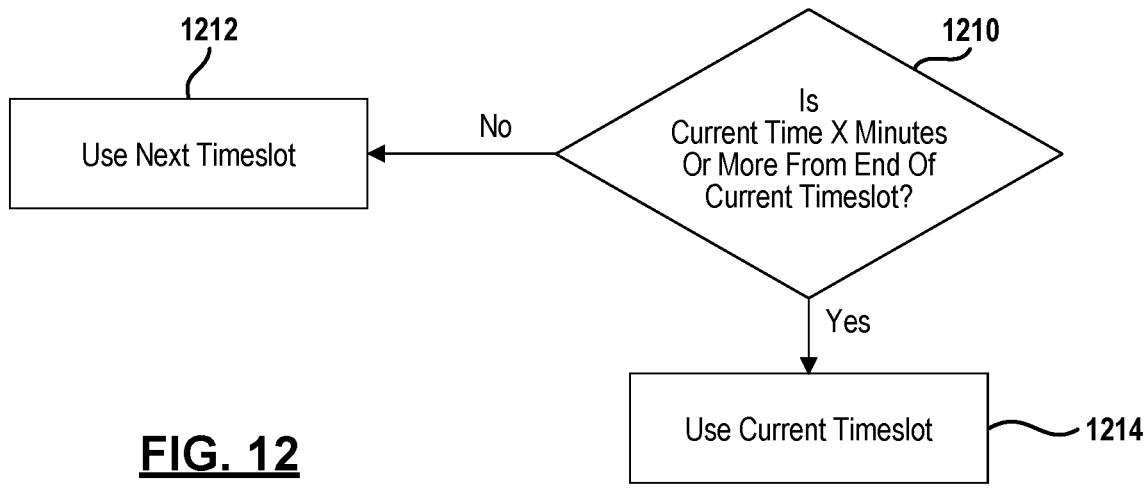
FIG. 12 is a flowchart of a method for determining the timeslot.

Referring now to FIG. 12, as mentioned above, the timeslot of interest must be determined. The timeslot used in the present example is 30 minutes for live programming. The timeslot may be extended for recorded programming such as 60 minutes. Also, if the current timeslot is near the end of the timeslot, there is no sense in providing current timeslot information. Rather, the next timeslot information may be provided near the end of the timeslot.

In step 1210, if the current time is X minutes or more from the end of the current time period (which may be 30 minutes), step 1214 uses the current timeslot. The value X may be five minutes or other appropriate setting. In step 1210, when the current timeslot is not X minutes or more from the end of the current time period, the next timeslot is used in step 1212. That is, when the current time is closer than X minutes, step 1212 uses the next 30-minute timeslot for generating recommendations. The timeslot definition may be used in FIG. 10 which in turn is used in FIG. 11. Thus, both the What's On recommendation list and the You Might Like recommendation list are based on the timeslot determination of FIG. 12.

Figure 13A:
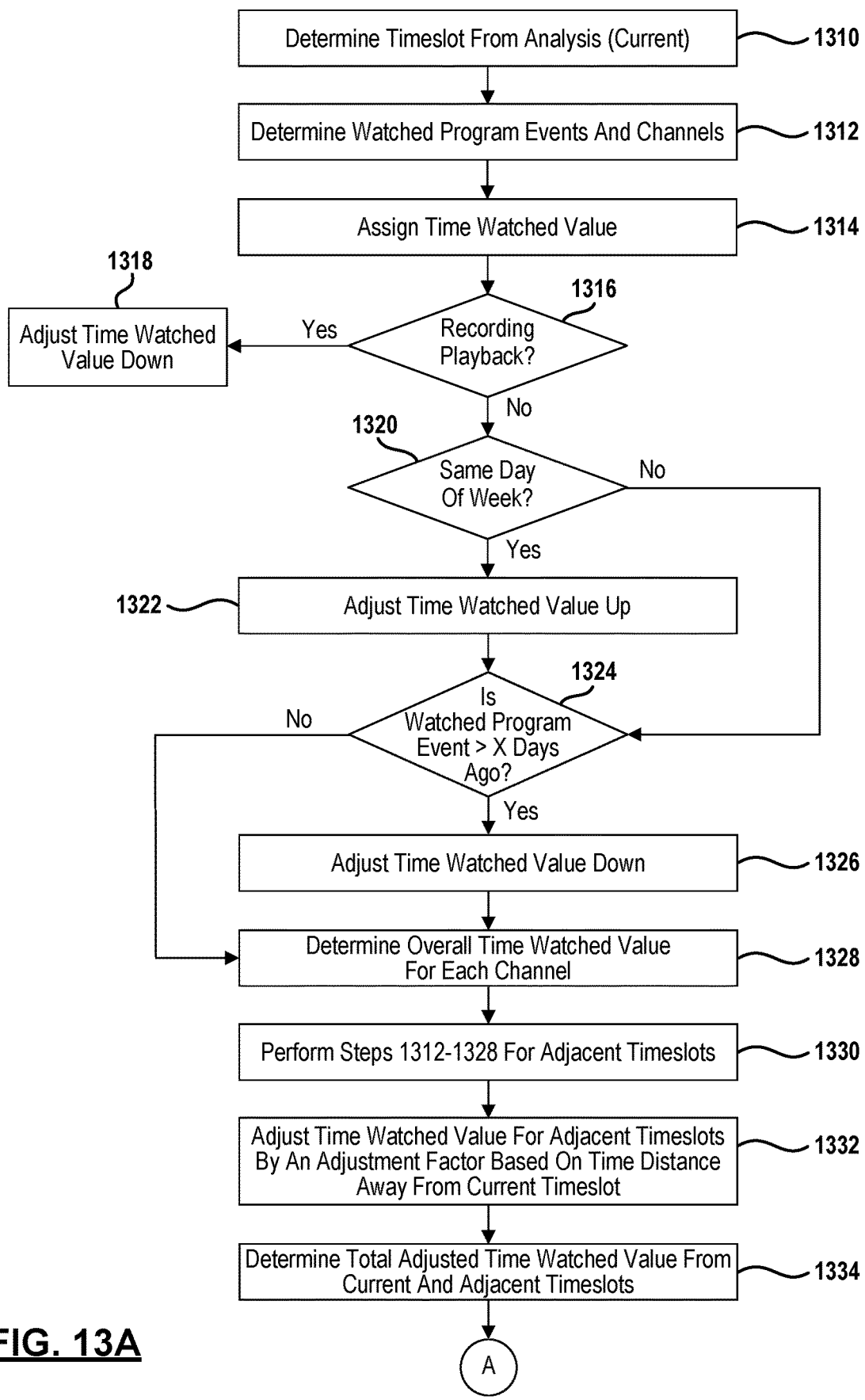
FIG. 13A is a method for generating the most watched channels by timeslot list.
Figure 13B:
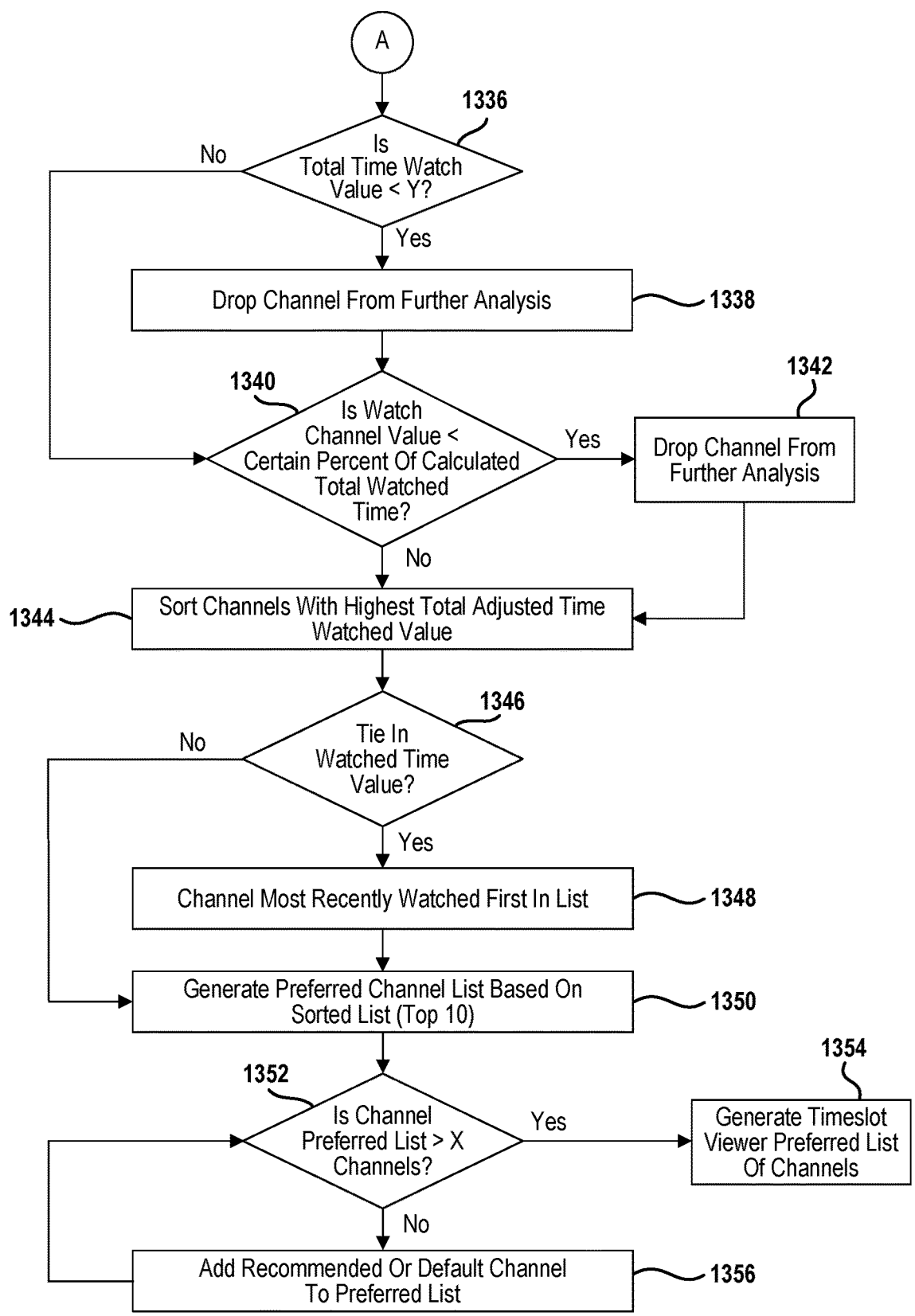
FIG. 13B is a flowchart for generating the timeslot viewer preferred channels list.

Referring now to FIGS. 13A and 13B, a list of the most watched channels by timeslot is determined. Thus, a list of the channels in a ranked order by count or other value such as a time watched value may be provided corresponding to the most popular channels watched during a particular timeslot. The channel list may include a channel identifier which corresponds to channels in the program guide.

In step 1310, the timeslot for analysis is determined. The timeslot for analysis may be the current timeslot or next timeslot depending on the current time relative to the end of the timeslot as described above in FIG. 12.

In step 1312, the watched program events from the viewer tracking log are obtained from previous days. The program identifier, channel identifier, and the time watched for each of the programs are obtained from the viewer tracking log. The time watched value is assigned in the viewer tracking log as set forth in step 1314. As will be described below, the time watched value may be adjusted. In step 1316, it is determined whether the watched program event was a playback of a recording or a live program. In step 1316, if the program is a recording, the time watched value may be adjusted downward by an adjustment factor. The adjustment factor may be adjusted downward to account for the playback of recordings being less important than the live viewings.

Referring back to step 1316, if the event is not a recording playback, step 1320 is performed. Step 1320 is also performed after step 1318. In step 1320, it is determined whether the "watched program" event occurred on the same day of the week as the current day. If the watched program event occurred on the same day of the week, the time value is adjusted upward in step 1322. Again, this may be another adjustment factor.

If the event did not occur on the same day of the week and after step 1322, step 1324 determines whether the watched program event occurred greater than X days ago. The value X may be set so that an adjustment factor may be used to reduce the value of old content. In step 1326, if the watched program event is greater than X days old, step 1326 adjusts the time value downward by an adjustment factor. After step 1326, step 1328 determines the overall time watched value for each channel. The overall time watch value of the values sum together and adjusted per the adjustment factors above.

After step 1328, step 1330 may perform the steps of 1312-1328 for adjacent timeslots. That is, the same analysis may be performed for future timeslots. This is an optional step. After step 1330, step 1332 may adjust the time watched value for adjacent timeslots by an adjustment factor based on the time distance away from the current timeslot. Thus, timeslots directly adjacent to the current timeslot may be adjusted downward less than slots two timeslots ago.

After step 1332, step 1334 determines the total adjusted time watch values for current and adjacent timeslots. A most watched channels list may then be generated. Each element of the list may include a time watched value. The list may be sorted by the time watched value with the most time watched being at the top of the list.

In step 1336, it is determined whether the total time watched value is less than Y. If the total time value is less than Y, the channel may be dropped from further analysis in step 1338. The value Y may be a value chosen so that only significantly watched values are used. In step 1340, it is determined whether the channel watched time value is less than a certain percentage of the total watched time. This step is also performed after step 1336. If the total watched time value is less than a certain percentage, step 1342 removes the channel from further consideration. Referring back to step 1340, when the watched value is not less than a certain percentage of the total watched time value. Step 1344 sorts the channels with the highest total adjusted time watched value. In step 1346, if there is a tie, step 1348 places the channel that was most recently watched first in the list. Step 1350 is performed after step 1348 and after step 1346 if no tie was found in the watched time value. In step 1350 a preferred channels list having channel identifiers in an ordered manner based upon the time watched is generated. Various numbers of channels may be selected, such as the top 10 channels. In step 1352, if the preferred channels list is greater than X channels, a timeslot viewer preferred list of channels is generated in step 1354.

In step 1352, if the preferred channels list is not greater than X channels, then step 1356 adds recommended channels from a recommended list to the preferred list. That is, the head end may generate a recommended channels list with default channels to use for recommendations if no other information is available. These channels may likely be the most popular channels determined by the user serviced by the head end. The channels from the list may be screened so that the channels received by the particular set top box or user device are used. The recommended list may include content in various categories and may alternate the categories. For example, movie, sports, kids, news channels may all be provided within the recommended channels list. However, one channel from each category may be provided at the top of the list so that the list may be varied in content. The recommended channels list may be communicated to the user device through various means including channel objects communicated with the program guide data.

Figure 14:
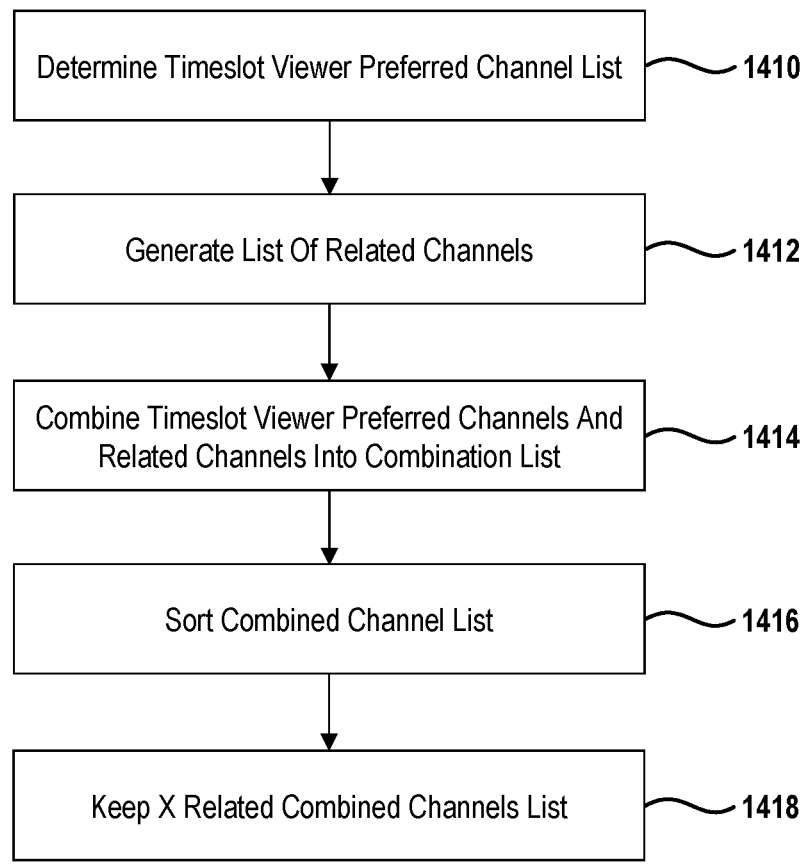
FIG. 14 is a flowchart of a method for generating the related channels list.

Referring now to FIG. 14, a method for generating a list of related channels to the timeslot viewer preferred list of channels is set forth. In step 1410, the timeslot viewer preferred channels list is generated from FIG. 13. In step 1412, a list of related channels for each channel in the list is determined. A list of related channels may be determined by descriptors provided with the program guide data for each channel. Fixed relationships between various channels may thus be provided and determined. The list of related channels includes channels that display similar programs or channels that are commonly watched by viewers having similar interests. In step 1414, the timeslot viewer preferred channels list and the related channels list are combined into a combined related channels list. In step 1416, the combined related channels list is sorted by value or score. Each channel in the combined related channels list is ranked or given a score value based on how related they are to what is watched at the user device. In step 1418, a limited number of channels from the combined related channels list are used. For example, the top thirty channels may be provided in the combined list.

Figure 15:
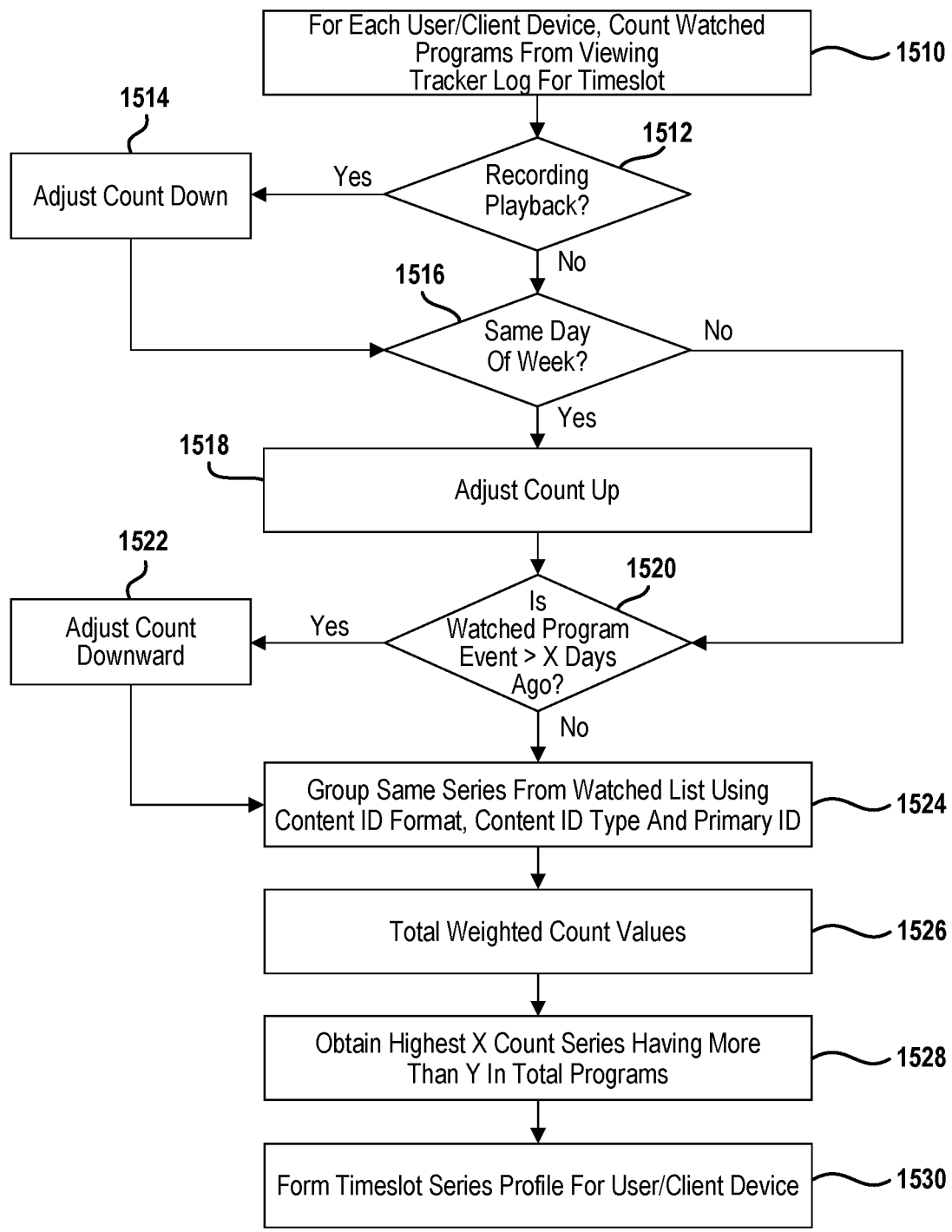
FIG. 15 is a flowchart of a method for generating a timeslot series profile.

Referring now to FIG. 15, a method for determining what television series have been watched during a specific timeslot is set forth. The series watched during a specific timeslot are referred to as a timeslot series profile. The timeslot series profile includes the program or series identifier. In step 1510, the viewing tracker log is analyzed to count the watched program events on previous days during the timeslot being analyzed. The watched program events may include both programs viewed live or played back from the digital video recorder. In step 1512, it is determined whether the program was a recording playback. If the watched program event was a recording playback, step 1514 adjusts the count or value associated with the watched program downward. In step 1512, if the event was not a recording playback, step 1516 determines if the event was performed on the same day of the week. If the event was performed on the same day of the week, step 1518 adjusts the count upward. After step 1518, step 1520 is performed. Step 1520 is also performed after step 1516 in which the event is now performed on the same day of the week. In step 1520 it is determined whether the watched program event was greater than X days ago. If the watched program event is greater than X days ago, then the count may be adjusted downward by an adjustment factor in step 1522. It should be noted that the adjustment in step 1522 may be optional.

After step 1522 and when the watched program event is not greater than X days ago, step 1524 is performed. In step 1524, the program content from the same series is grouped together using the content identifier, content identifier type and/or the primary identifier or other indicator of series. As mentioned above, the content identifier may have a series identifier incorporated therein. In step 1526, the weighted count values for each program in the group are summed together. The highest count values for a series having more than Y total programs, is generated. Thus, a timeslot series profile list having series that includes a type of identifier such as a content identifier, a content type and a primary identifier is formed. The highest priority of content may be at the top of the list. It should be noted that if two or more series have the same total count value, the priority may be determined based on the position of the series as specified in the prioritizer. This same total weighted count value may also be prioritized by the most recently viewed series content. It should also be noted that the time series profile is generated if the series generated is greater than two total programs. As long as there is more than two total programs within a series that have been watched, the timeslot profile series is generated in step 1530.

Figure 16:
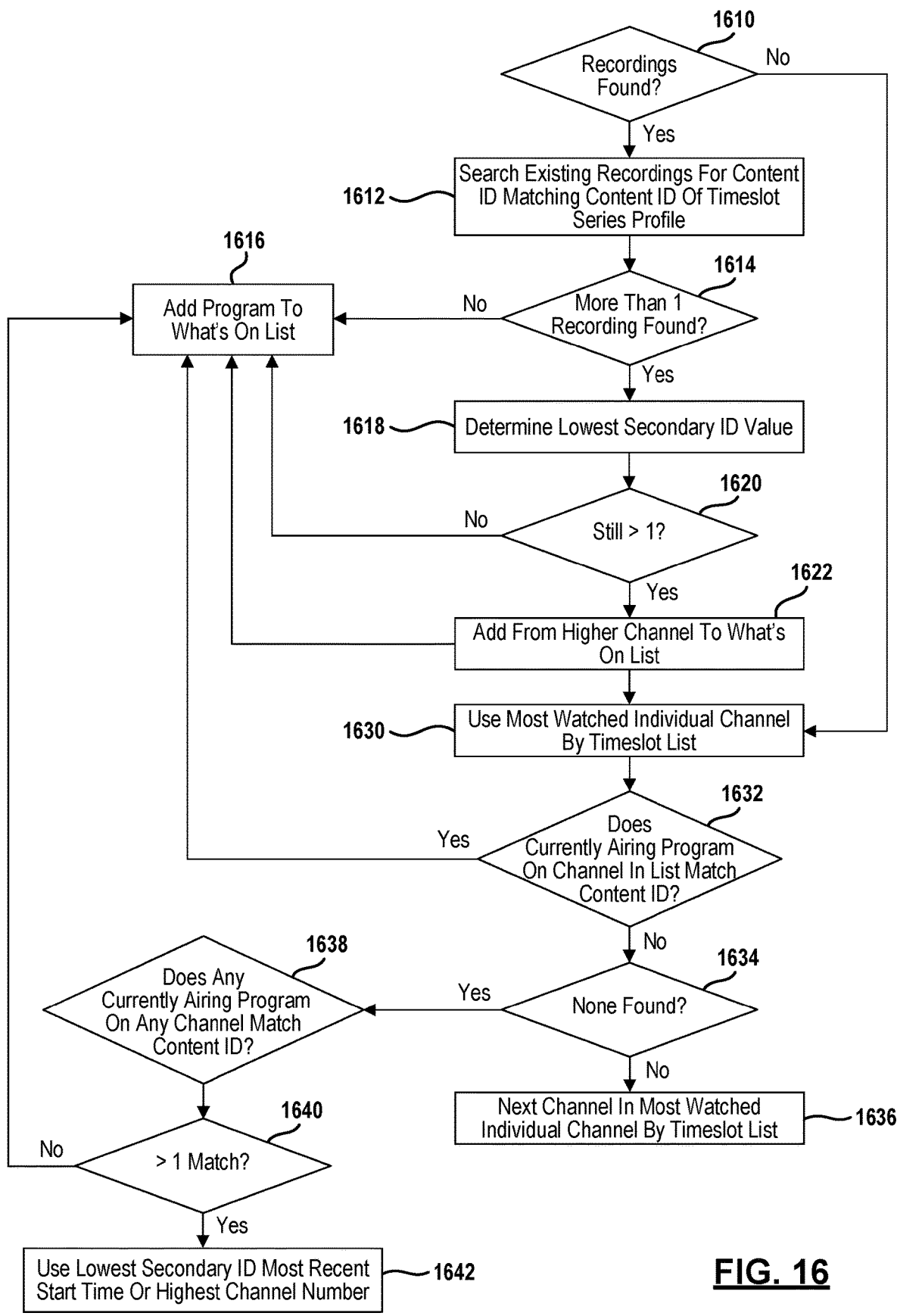
FIG. 16 is a flowchart of a method for generating the timeslot series profile match.

Referring now to FIG. 16, a method for determining a timeslot series profile match is set forth. The timeslot series profile match attempts to match currently airing programs or existing recordings to the previously generated timeslot series profile from FIG. 15. In step 1610, if recordings are found in the system, step 1612 is performed. Step 1612 searches existing recordings for the content identifier matching the content identifier of the first content in the timeslot series profile. In step 1614, it is determined if more than one recording is found. If not more than one recording is found, then the program content is added to the What's On list. The title, content identifier or any other type of identifier may be added to the What's On list in step 1616.

Referring back to step 1614, when more than one recording is found, step 1618 attempts to select one of the recordings. In step 1618, the content identifier string may be used. In this specific example, the recording with the lowest secondary ID value which, in the present example, is the fourth number in the content identifier string is used in the determination. The recording with the lowest secondary identifier is used. In step 1620, if there is not greater than one value, the lowest secondary ID value is added to the list in step 1616. If there is still greater than one recording, step 1622 adds the content from the higher channel to the What's On list. Of course, steps 1618 and 1622 are arbitrary ways for resolving the conflict in the list.

If no recordings were found in step 1610, step 1630 is performed. In this case, the most watched channels by timeslot determined in FIG. 13 are utilized. In step 1632, it is determined whether the currently airing program on that channel has a content identifier matching the first three values as those in the content identifier for the first series in the timeslot profile. If it does, step 1616 adds the currently airing program to the What's On list. In step 1632, if the currently airing program does not match What's On the timeslot profile in step 1634, the next channel in the most watched channels list is used in step 1636. After step 1636, step 1632 is repeated.

Referring back to step 1634, when the currently airing program does match the timeslot profile, it is determined whether the currently airing program on any channel matches the content identifier from the list in step 1638. After step 1638, if more than one match is not found in step 1640, step 1616 adds the currently airing program to the What's On list. In step 1640, if more than one match is found, the secondary identifier or the most recent start time or the highest channel number may be used to resolve the conflict in step 1642. This step may perform steps similar to steps 1618-1622 described above.

Figure 17:
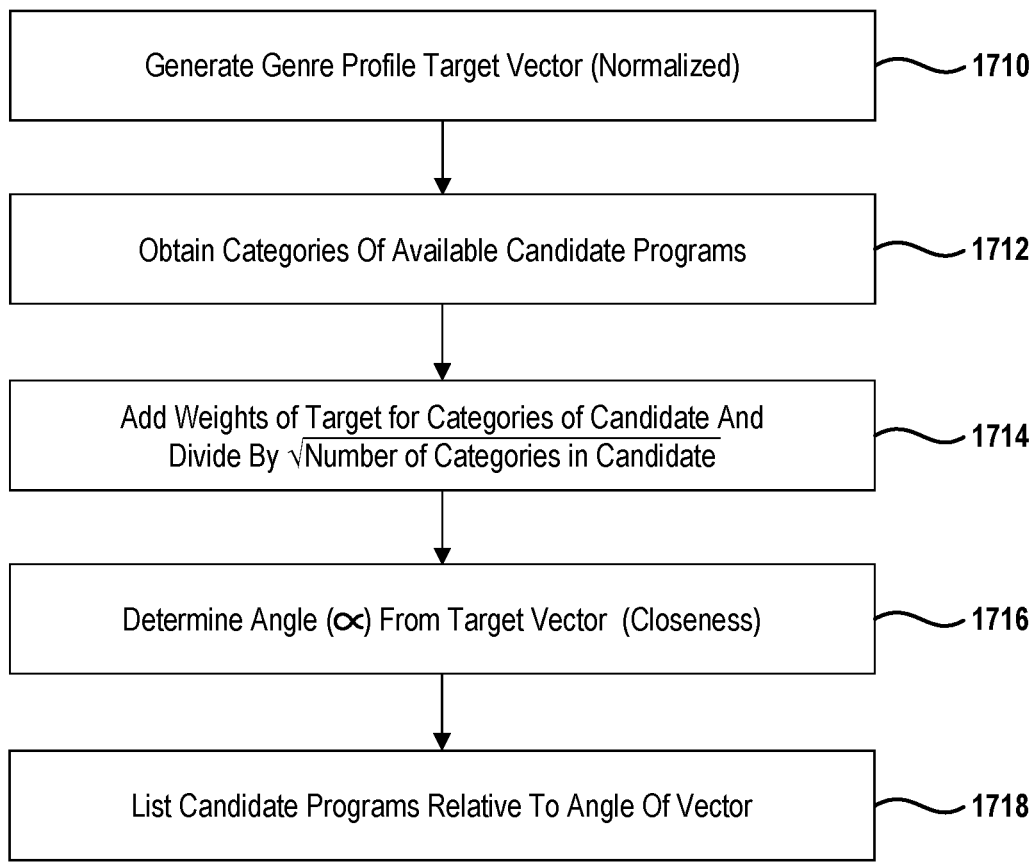
FIG. 17 is a flowchart of a method for generating a genre match.
Figures 18, 19, 20:
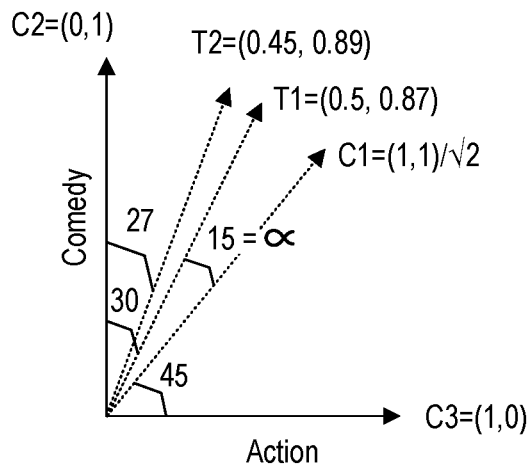
FIG. 18 is a vector representation of a genre match example.
FIG. 19 is a table corresponding to the genre match algorithm for the example of FIG. 18.
FIG. 20 is a table illustrating the adjusting of genre weights in response to a watched program event.

Referring now to FIGS. 17, 18 and 19, some of the above-mentioned methods refer to genre-matching. In FIG. 17, genre-matching is described in further detail. Genre-matching uses category weighting to represent a user's taste based upon their previously watched programs. In this method, the recommendation engine ranks programs by applying a calculation to each candidate program and returning the programs by priority based on the value returned for the calculations. The programs are then ranked highest to lowest based on the calculation of each value for each program. In general, the calculation is derived against the program genres from the APG object category description. The calculation adds a weight for each category index found in the candidate program and the sum represents the program's cosine similarity with the user's genre profile. In step 1710, a genre profile target vector is determined. The genre profile target vector is learned over time based on watched program events. The genre profile target vector may be adjusted on the fly as new watched program events occur. A genre profile target vector may be adjusted for all watched programs or a separate target vector that applies each timeslot may be adjusted only when programs are watched in the time-slot. In FIG. 18, a simplified two-dimensional representation of comedy and action is illustrated. However, in an actual implementation, multiple vectors with multiple characteristics may be used. In this example, the target vector T1 is a unit vector which equals (0.5, 0.87) as its components. The target vector T1 is compared to a candidate program. The categories of the candidate program are obtained in step 1712. In FIG. 18, vector C1 represents action, comedy and vector C2 represents comedy, while vector C3 represents action. Each candidate program vector is a unit vector having category weights equal the inverse square root of the number of categories.

In step 1714 the cosine similarity is calculated. The cosine similarity is a measure of the closeness of a candidate program vector to the genre profile target vector. The dot product between the candidate unit vector and the target unit vector is equal to the cosine of the angle between these vectors. The dot product is calculated by adding the category weights of the target vector for each category in the candidate program. The sum of weights is divided by the square root of the number of categories. This genre match calculation is illustrated in FIG. 19. In FIG. 19, a table having category vectors in the first column, action in the second column, comedy in the third column, and cosine similarity is set forth. The target vector T1 has a value of 0.5 for action and 0.87 for comedy. It should be noted that these values represent a normalized unit vector. Candidate C1 has an action value of 1 over the square root of 2 and a comedy value of 1 over the square root of 2. Candidate C2 has an action value of 0 and a comedy value of 1 and candidate C3 has an action value of 1 and a comedy value of 0. Thus, the cosine similarity of each is 1, 0.97, 0.87 and 0.5 respectively. The angle of the cosine is in parentheses in the cosine similarity column. The closest vector will have the highest cosine value and thus the second row candidate C1 has the lowest angle and thus is the most similar. Essentially, the cosine similarity represents the closeness of the vectors. The actual angle need not be determined since the closest to the number 1 is the closest in cosine similarity. The cosine between the two unit vectors of the target T1 and C1, C2 and C3 is derived from the dot product of the values in the vectors.

In FIG. 17, step 1716 determines the angle from the target vector. However, as mentioned above, the closeness of the target vector to a candidate vector is determined by the cosine values and may not require the determination of the actual angle. In step 1718, the list of candidate programs relative to the angle of the vector or the closeness of the target vector is set forth.

Figure 21:
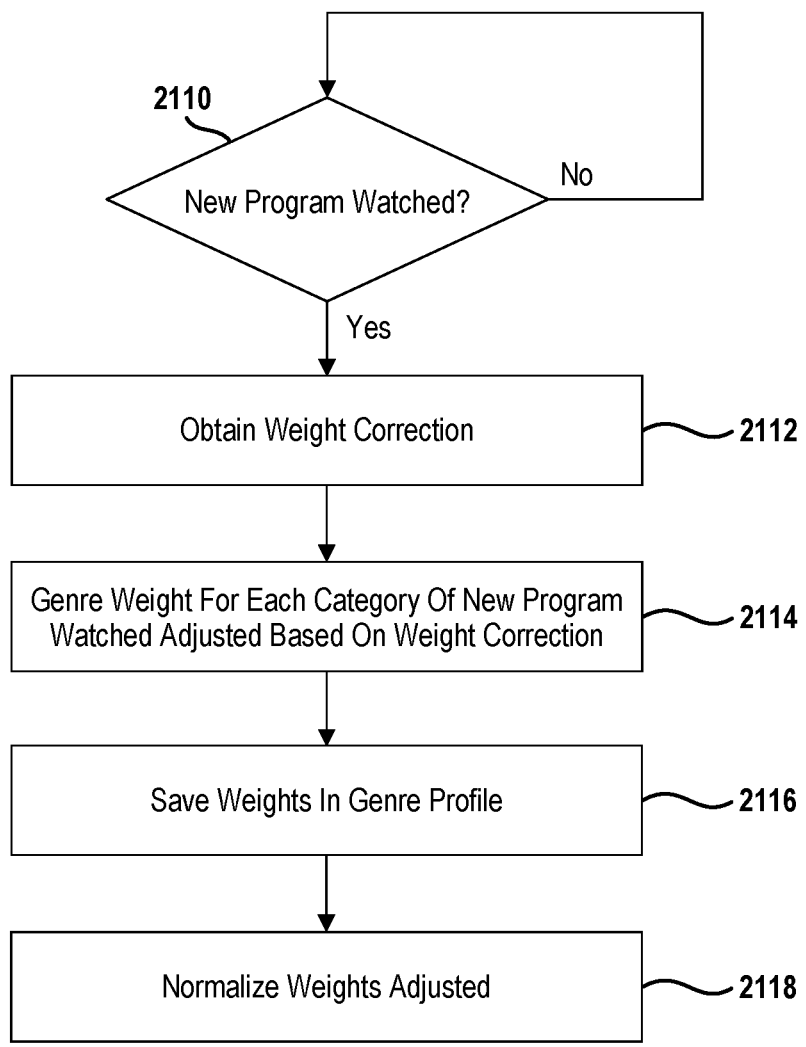
FIG. 21 is a flowchart of a method for adjusting genre weights in response to a watched program event.

Referring now to FIGS. 18, 20 and 21, the correction value may be obtained when a new program is watched in 2110, a weight correction of target vector T1 illustrated in FIG. 18 is obtained. The new target vector is target vector T2. The table illustrated in FIG. 20 illustrates an example target vector with various genre weights in four different categories, with initial weights 0.13, 0.67, 0.72 and 0.12 respectively. If a program is viewed which has only categories with category index 1, 2 and 4, but not 3, the genre match result of the viewed program is the sum of the weights for all existing categories in the program divided by the square root of the total number of categories. In this case, if categories 1, 2 and 4 are used, the result is 0.13 plus 0.67 plus 0.12 divided by the square root of 3 which equals 0.53. The value 0.53 is a genre match value.

The weight in the target vector is adjusted to new weight to incorporate feedback from recently watched programs. The new weight equals the old genre weight plus the step size divided by the square root of the number of categories in the program multiplied by the normalization value minus the genre match calculation of the program. For example, if the step size is 1, the weight adjustment is 1 minus 0.53 divided by the square root of 3. The resulting value 0.27 is the adjustment for the genre weights corresponding to the viewed program. Thus, if the program having the weights illustrated in FIG. 20 were used, the new category indexes of 1, 2 and 4 are adjusted to 0.4, 0.94 and 0.39, while category 3 remains 0.72. The adjusted weights are also shown in FIG. 20. The length equals the square root of the sum the genre weights squared. The new length equals 1.31. One divided by the new length is then multiplied by each category index weight to obtain the new normalized weights. The new target vector comprising the normalized weights for the four categories changes to 0.31, 0.72, 0.55 and 0.30, respectively.

Referring back to FIG. 21, the genre weights for each of the category of the new program watched is adjusted based upon the weight correction as described above in step 2114. In step 2116, the weights in the genre profile are adjusted. The weights are then normalized by dividing by the length as described above in step 2118. The genre match calculation described above corresponds to a cosine similarity error measurement, and the weight adjustment corresponds to a stochastic gradient descent, but many other genre matching or weight adjustment algorithms may be used.

Referring now to FIG. 22, a use case is presented in which the set top box or user device has stored the viewing history illustrated in the viewer tracking log over the last 36 days. In this example, a viewer that is using the user device asks for recommendations at a time when he normally watches a particular series. As can be seen in the figure, a title column, a content identifier column, a channel column, a date column which gives the relative date of the content, a timeslot column, a user device identifier column and a watched time column are illustrated. Each of the titles thus has each one of the different types of data in each of the columns associated therewith. Also in the following example it is presumed that the recommendation request is performed at 7:12 p.m.

Referring now to also FIG. 23, the program guide includes the data in the table. The program guide data may include the title, a content identifier, a channel, a date, start time and duration. Each of the titles has each of the data from each of the columns associated therewith. Data has also been provided for related episodes which includes the Simpsons episode content identifier 11 20 8 which is linked to the Family Guy episode 11 46 17. In the following case, the timeslot to be used is the 7:00 p.m.-7:30 p.m. timeslot. By applying the above methods, the timeslot series profile returns Seinfeld and the Simpsons. The series are identified in this Example as the first four digits being the same. (Simpsons, 1 1 20, Seinfeld 1 1 10). The viewer preferred channels are 217, 216, and 705. The first timeslot profile series matches an episode currently airing on a channel list in the most watched channels by timeslot list so that Seinfeld on channel 217 at 7:00 p.m. is added to the What's On results list. The second timeslot profile series does not match an episode on any channels in the most watched channels by timeslot list but, does match a currently airing program on channel 215. Therefore, the Simpsons on channel 215 at 7:00 p.m. is added to the What's On results list.

The currently airing program on the second channel in the most watched channels in the timeslot list has not been added so, based on a genre match ranking, Futurama on channel 216 at 7:00 p.m. is added to the What's On results list.

The currently airing program on channel 705 is the only other program not added yet. The programs on the other two channels have already been added. Therefore, golf on channel 729 at 6:00 p.m. is added to the What's On results list.

For the You Might Like list, the data link for the Simpsons refers to the Family Guy on channel 306 so that the Family Guy is added to the You Might Like results list. All upcoming programs for up to three hours may be obtained from the related channels list generated from the viewer-preferred channels list. Presuming the following match the genre matched test, there are only three shows that have not passed or been added to the What's On list or the You Might Like list. These are Nightly News on channel 217 at 7:30 p.m., Futurama on channel 216 at 7:30 p.m. and Sports Center on channel 729 at 9:00 p.m. These results may be sorted chronologically so that nightly news, Futurama, Sports Center and The Family Guy are presented in that order. A screen display having posters or thumbnails and/or alphanumeric characters may be used for presenting the What's On and You Might Like lists.

Referring now to FIG. 24, the recommendations for a new set top box or client device do not take into consideration previously watched programming. In this case, a recommendation is requested by the user at 7:12 p.m. The data in FIG. 24 is within the program guide. In this example, it is also presumed that the Simpsons episode with a content identifier equal to 1 1 20 8 links to The Family Guy episode content identifier equals 1 1 46 17. It is also presumed that no daily editorial lists are defined. The recommended channels list includes in this order: channel 216, channel 217, channel 215, channel 710, channel 340, channel 450, channel 729, channel 1007, and channel 1005. Five programs are selected that correspond to the programs on the recommended channels list. In the proper order, Futurama on channel 216, Seinfeld on channel 217, the Simpsons on channel 215, Psyche on channel 710 and golf on channel 729 are returned. The genre match algorithm is applied to each program and assuming that they all pass except for Seinfeld on channel 217, the What's On list will result in Futurama, the Simpsons, Psyche and golf all being returned in that order.

The You Might Like list uses a related data link which, as mentioned above, links the Simpsons to The Family Guy. The related channels list ultimately gathers only three programs because they are the only current and future programs left airing on any channel of the recommended channels list. The following three programs, Seinfeld, House and Sports Center are added to the You Might Like list. Chronologically, the list may be sorted as Seinfeld, House, Sports Center and The Family Guy.

Figure 25:
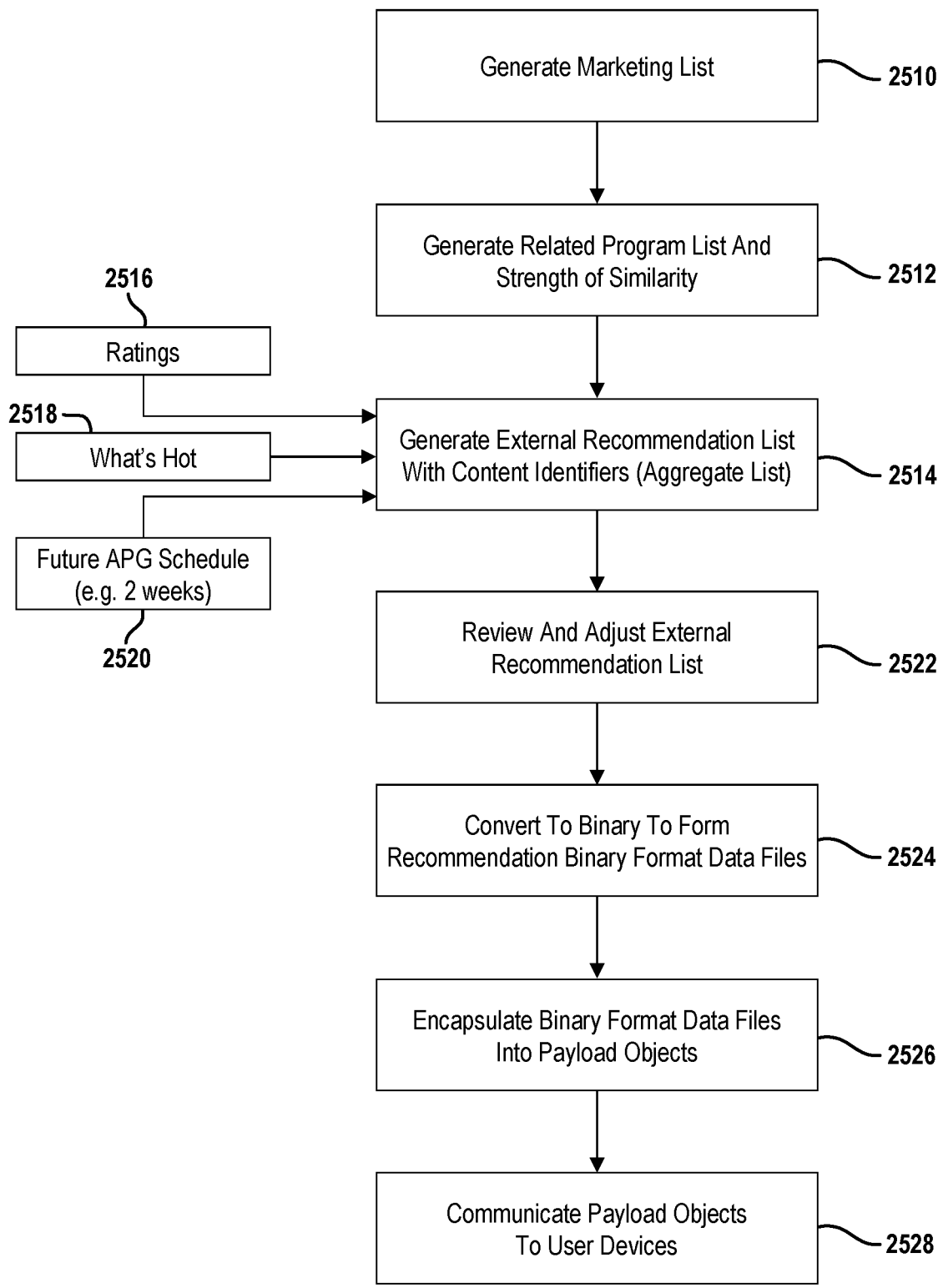
FIG. 25 is a flow chart for a method of generating an external recommendation list.

Referring now to FIG. 25, a method for communicating a recommendation to a user device is set forth. In step 2510, a marketing list is generated. The marketing list may be generated within the head end 12. The marketing list may be an ordered list of content or content identifiers that has been placed in a particular order by a marketing specialist. The order may represent a priority order. In one example, the marketing list may have a score or level associated therewith. In another example the marketing list may be categorized. For example a mandatory category may be provided. The mandatory category may be the highest priority program to be recorded. The order of the mandatory programs may be determined by their order on the marketing list. Mandatory programming may apply to all user devices.

Another category may be a targeted program category. This second category is below the first category of mandatory programs in terms of priority. Amongst them the targeted program category list may be determined by a calculated probability value. The determination of the probability is set forth below. In short, the probability is determined within the set top box or user device. The targeted programs may apply only to user devices with a viewing history that pertains to the targeted programs.

Another category set forth within the marketing list is an optional program. The optional programs have a lower priority than the targeted programs and the mandatory programs. Amongst themselves the optional programs is determined by their order in the marketing list. These programs apply to all user devices.

Figure 26:
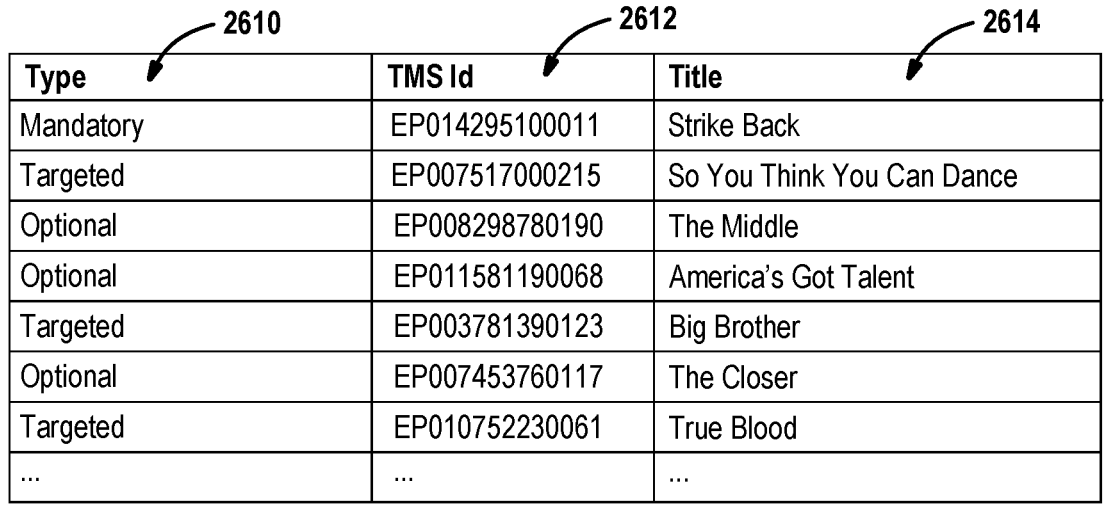
FIG. 26 is a table illustrating an example of a marketing list.

Referring now to FIG. 26, an example of a marketing list is set forth. In this example the first column 2610 indicates the type set forth above. Examples of mandatory, targeted and universal/optional are set forth. The marketing list may also include an identifier for the content. In this example the identifier is a tribune media system identifier set forth in column 2612. Each content title has a unique identifier. Each content may also include a title which is included within the column 2614. Although only seven titles are shown in the marketing list, tens or hundreds of titles may be included therein.

Referring back to FIG. 25, after the marketing list is generated in step 2510, step 2512 generates a related program list. The related program list may also include a strength of similarity therewith. The strength of similarity is a related score. The related program list is used to generate the relationship needed for the targeted program for the recommended recorded list. The relationship allows the user device to easily determine if a candidate targeted program is applicable to a particular user device by comparing the user devices viewed programs to the related programs of the candidate target program. This is a list of possible programs to record if there is a match to at least one of its related programs.

Figure 27:
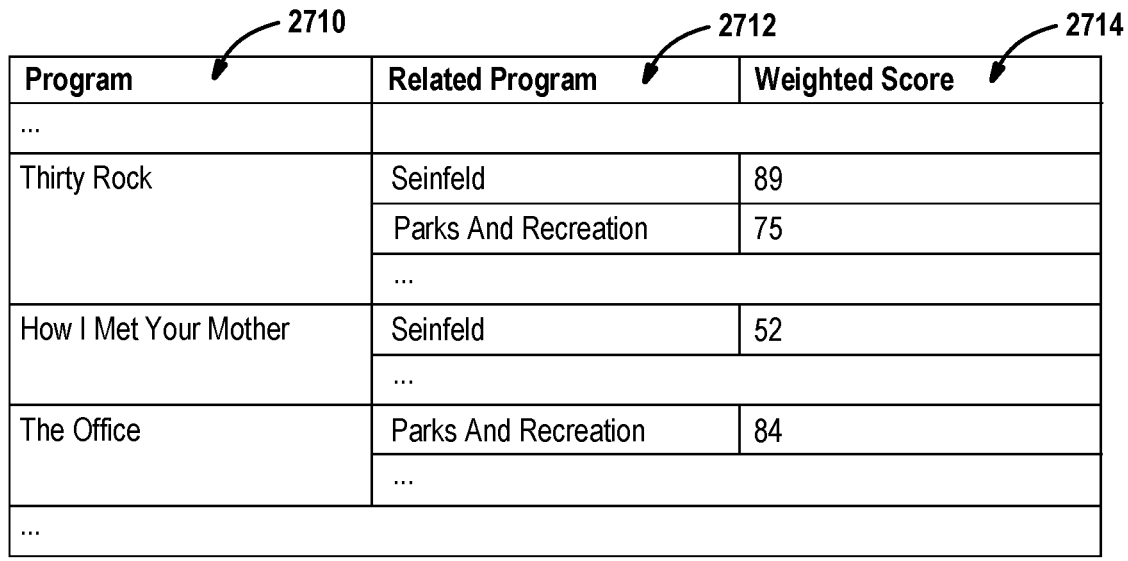
FIG. 27 is a table illustrating a related program list.

Referring now to FIG. 27, a related program list is illustrated. In this example, a program column 2710 includes various programs. Related programs are set forth in column 2712. The related programs may be generated automatically, by a marketing employee or a combination of the two. Column 2714 illustrates a weighted score that corresponds to a strength of similarity for the related programs. In this example, Seinfeld had a weighted score of 89 in relation to the program Thirty Rock. "Seinfeld" and "Parks and Recreation" had a weighted score of 75 in relation to the program Thirty Rock. Of course, various numbers of related programs and weights may be used.

An external service may also be used in the formation of the related programs list. For example, the commercial service VTAP may be used. Of course, other types of commercial services may be available for providing related programming.

Referring back to FIG. 25, step 2514 generates an external recommendation and list with content identifiers. This may also be referred to as an aggregated list. The external recommendation list may include the marking list, the related program list as well as a program guide schedule for a predetermined amount of time such as two weeks. The external recommendation list may also be influenced by outside sources including a ratings source. Various types of rating sources may be used to influence the external recommendation list in both the order and content of the list. Ratings providers may include Nielsen® and Blue Fin®. The ratings providers are illustrated in box 2516. A "What's Hot" list generated by the service provider may also be used to influence the external recommendation list. The "What's Hot" list is generated by the service provider to correspond to the most watched and most popular items. In this example the "What's Hot" list 2518 is generated within the service provider of the head end 12. As mentioned above. The future program guide schedule 2520 may also be provided with or influence the external recommendation list. After the external recommendation list is generated, step 2522 provides a review of adjustment of the external recommendation list.

In step 2524 the external recommendation list is converted to binary to form a recommendation binary format data file. In step 2526, the binary format data files are encapsulated into payload objects. In this example the use of payload objects is a known method for communicating program guide data. In this example, in addition to program guide data, the payload objects may be used to communicate binary format data files. In step 2528 the payload objects are communicated to the user devices.

Figure 28:
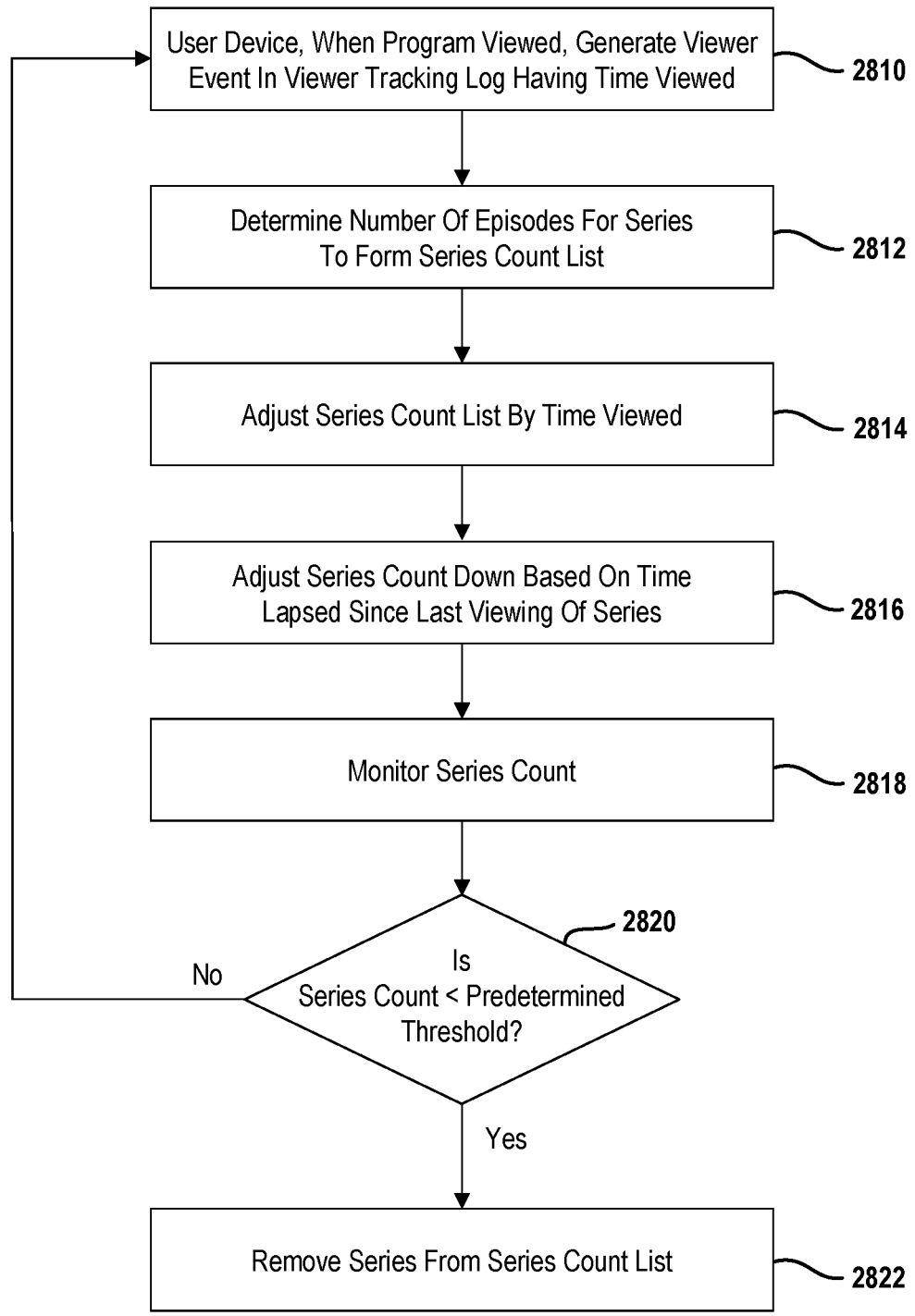
FIG. 28 is a flow chart of a method for maintaining a series list.

Referring now to FIG. 28, a method for generating a most viewed series list is set forth. In step 2810 a user device generates a viewer event in response to a program being viewed. The viewer event for the program viewed is stored in a viewer tracking log having a time viewed. The viewer event may be received by the user device in various predetermined increments such as every half hour as described above. In step 2812 the number of episodes for a series is used to form a series count list. In step 2814 the series count is adjusted by the amount of time viewed within the half hour. In step 2816 the series count may be adjusted down based upon the last time and since the last viewing of the series. Thus, if a series is not watched for several weeks, the count may be adjusted downward. If the series is watched on a regular basis the series count may be maintained. In one example a reduction of 9% of the series count for every thirty days not viewed may be used. In step 2818 the series count is monitored for each of the series in a series count list. In step 2820, if the series count is less than a predetermined threshold, step 2822 removes the series from the series count list.

Referring back to step 2820 when the series count is not less than the predetermined threshold the system returns to step 2810. In a system that includes multiple user devices, the viewing history of all of the clients within the local system may be aggregated in the most viewed series list. Alternatively, the individual user devices may have separate series lists.

Figure 29:
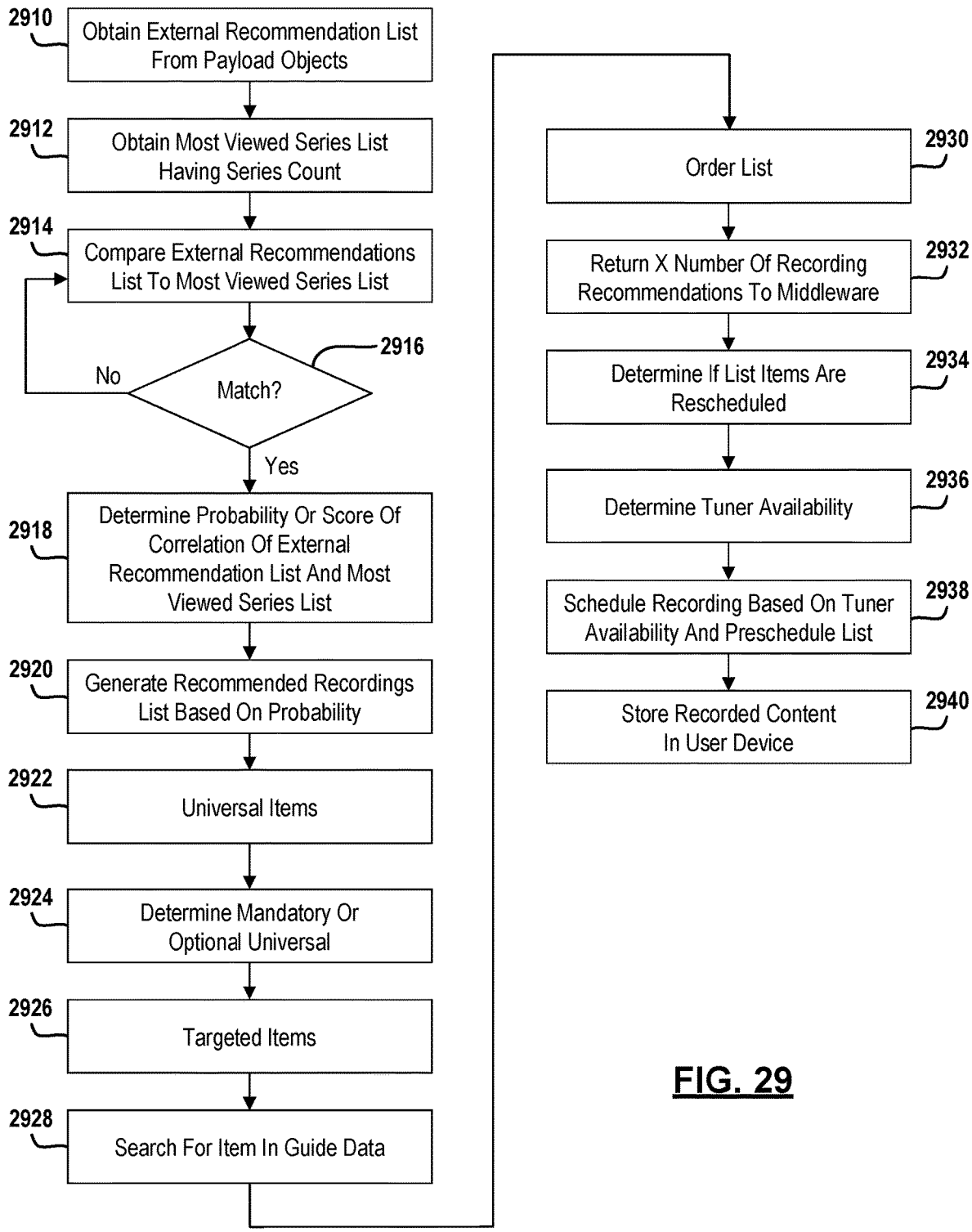
FIG. 29 is a flow chart of a method for storing content in the user device.

Referring now to FIG. 29, a method for storing content in a user device is set forth. In step 2910, the external recommendation list is received from the payload object. In this example the payload objects are received from the satellite. Other systems may receive the payload objects from the network 36 illustrated in FIG. 1. That is, the payload objects may also be received through a broadband or other type of network.

In step 2912 the most viewed series list having a series count is determined. In this example the most viewed series list having a series count may be determined at a home media center. This process was described above in step 2812.

In step 2914, the external recommendations list is compared to the most viewed series list. The items may be compared on an entry by entry level. In step 2916 if a match is not determined, step 2914 proceeds until each of the external recommendations list is compared to the most viewed series list. When matches are determined in step 2916, step 2918 determines the probability of correlation of external recommendations list and the most used series list. This may be performed on a periodic basis such as once every night.

In step 2920, a recording recommendation list based on the probability of various items of the list is generated. This process may be initiated by the recommendations module requesting content to be recorded and may be performed periodically such as every thirty minutes. The recommendation engine may request up to a predetermined number of content titles for recording in any timeslot. In step 2922 when the items are universal items within the recording recommendation list, the item's start time and end time are determined. The item's channel values may be used to narrow the search. In step 2924, the list item is determined whether it's a mandatory universal item or an optional universal item. A value may be assigned based upon whether the editorial subtype is mandatory or optional. In step 2926 is determined whether the item in the list is a targeted item. The probability value may be zero. In step 2928, the guide data is used to determine the start time and end time values as well as the channel values for the targeted item. If a matching item is found in the time period of interest the targeted item is added to the recommended recording list. In step 2930 the recommended recording list is ordered. In this example the mandatory/universal items are first. These items may be placed in the recording recommendation list by position in the editorial list. Next, targeted items may be ordered by calculated probability. Optional items may be positioned last in the editorial list. In step 2932 the predetermined number of recording recommendations is returned to the middleware of the user device.

In step 2934, it is determined whether the returned items are already prescheduled. If the items on the list are prescheduled by a user previously requesting the items, the recording is not scheduled twice and is thus removed from the recording recommendations. In step 2936 the tuner availability is determined. The maximum number of program content that may be recorded depends upon the available tuners. Tuners may be used for watching live content as well as recording requested content from the user device. Watching live content and recording content requested by a user through a user interface or the like has higher priority than content recorded automatically. In step 2938, the recording is scheduled based upon availability and the prescheduled items. In step 2940, the content is recorded and stored within a memory of the user device. Further details of the recording process are provided below.

Figure 30:
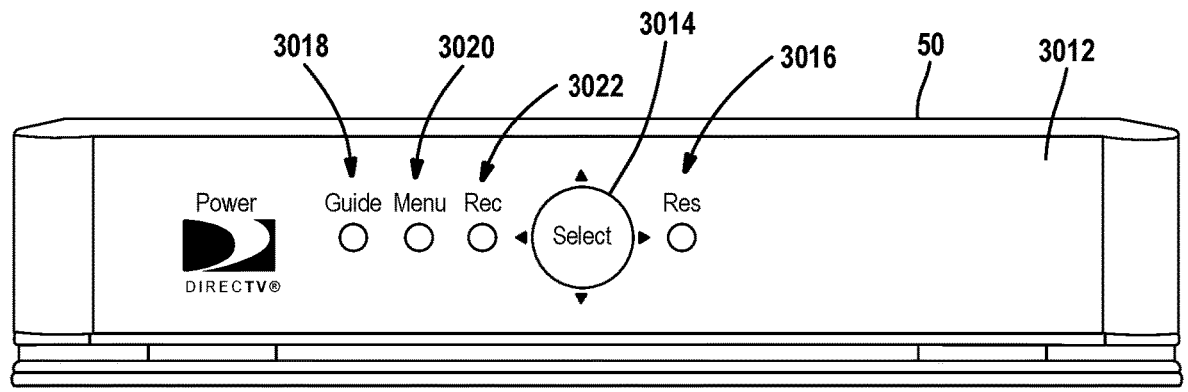
FIG. 30 is a front view of a user device.

Referring now to FIG. 30, a home media center 50 is illustrated. In this example, a front panel 3012 is illustrated having various controls including a selector 3014 for providing a user interface for selecting various content and moving cursors on a screen display. Indicators 3016 indicate the resolution of the content being received. A guide indicator 3018 indicates the guide is being viewed. A menu indicator 3020 indicates that a menu is being displayed. A recording indicator 3022 is illuminated to indicate content being recorded within the user device. As will be mentioned below, the recording indicator 3022 may be illuminated when the user device is recording. However, the recording indicator 3022 may also be suppressed when content from the recommended recording list is being recorded. Because the content from the recording recommendation list is very low in priority, by not illuminating the recording illuminator, the user will think the user device is available to record recordings or tune to a live program. Because of the low priority of recording recommendation list content, the recording recommendations will be stopped upon user interaction for the use of another tuner.

Figure 31:
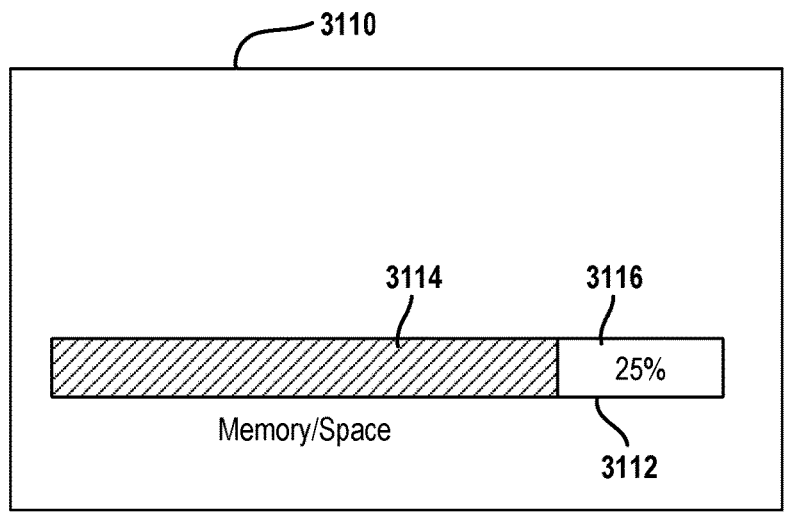
FIG. 31 is a screen display of a memory space indicator.

Referring now to FIG. 31, a screen display 3110 illustrating a memory space indicator 3112 is set forth. The memory space indicator corresponds to the available memory capacity available within the user partition. In this example, the memory space indicator 112 has a used portion 3114 indicating 75% available space. An unused capacity portion 3116 illustrates 25% available space. As will be described below the amount of space available may not include the recording recommendation. Thus, the unavailable space includes the content requested specifically by the user. The recommendation recordings are included within the unused capacity 3116. That is, the memory space associated with the content recorded from the recording list is not shown in the memory space indicator.

Figure 32:
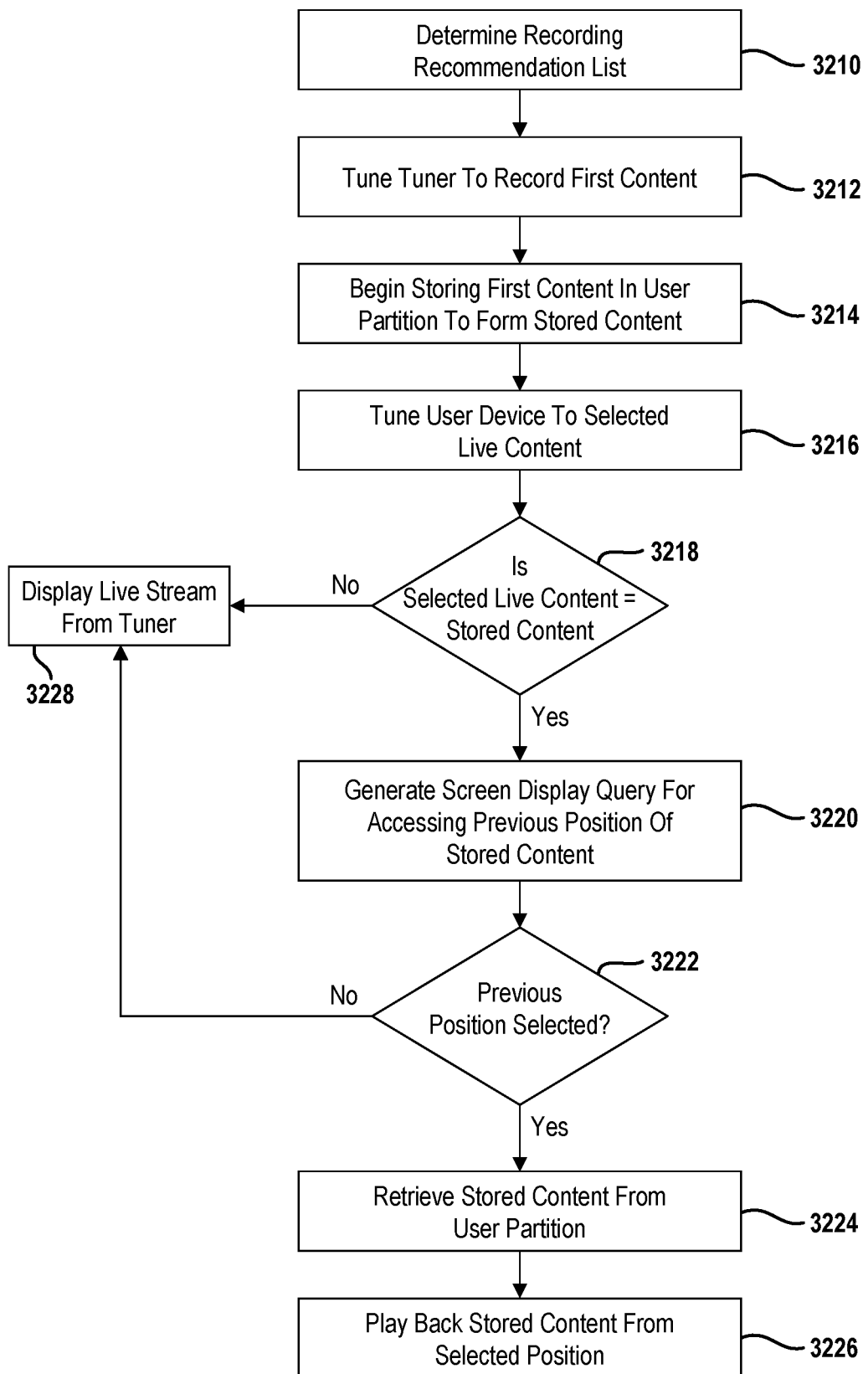
FIG. 32 is a flow chart of a method for changing a screen display.

Referring now to FIG. 32, a method for storing content within the user device is set forth. As mentioned above the user device may be in set top box 22, a home media center 50, or another type of media device which is a mobile device 40 as illustrated in FIG. 1. In step 3210 the recording recommendation list is generated as described above. In step 3212 a tuner of the user device is tuned to record the first content. That is, the content list may have various information associated therewith so that the channel, time and other recording information may be determined.

In step 3214, the content from the recording list is stored in the user partition to form stored content. In step 3216, the user device is tuned to select live content. This may be performed by the user using a remote control device to tune to a predetermine channel. A remote control device is one example of an interface for tuning to live content. Control buttons on the user device itself may also be used as the user interface. Content may be selected from a graphical user interface displayed on the screen display. This includes the program guide as well as a user interface that displays recommendations from the live content. Such a user interface may be referred to a "What's On" user interface.

In step 3218 it is determined whether the selected live content in step 3216 corresponds to content that has already been stored in the user device. Such content may be fully stored or partially stored. The user may tune to the content after the content start time. The user device may be recording the content automatically because the content may be on the recording recommendation list. If the selected live content is stored content step 3220 generates a screen display query for accessing a previous position of the stored content. For example, the screen display may ask the user if the user would like to restart the content from the beginning position or another previous position. This may be referred to as a restart query. If answered affirmatively, a restart signal may be generated by the controller. In step 3222, if a previous position or restart was selected the previous stored content is retrieved from the user partition in step 3224 in response to a restart signal. Thereafter, the stored content is played back from the selected position in step 3226.

Referring back to steps 3218 and 3222, when either of these steps is answered in the negative, the live screen may be displayed from the tuner in step 3228.

Figure 33:
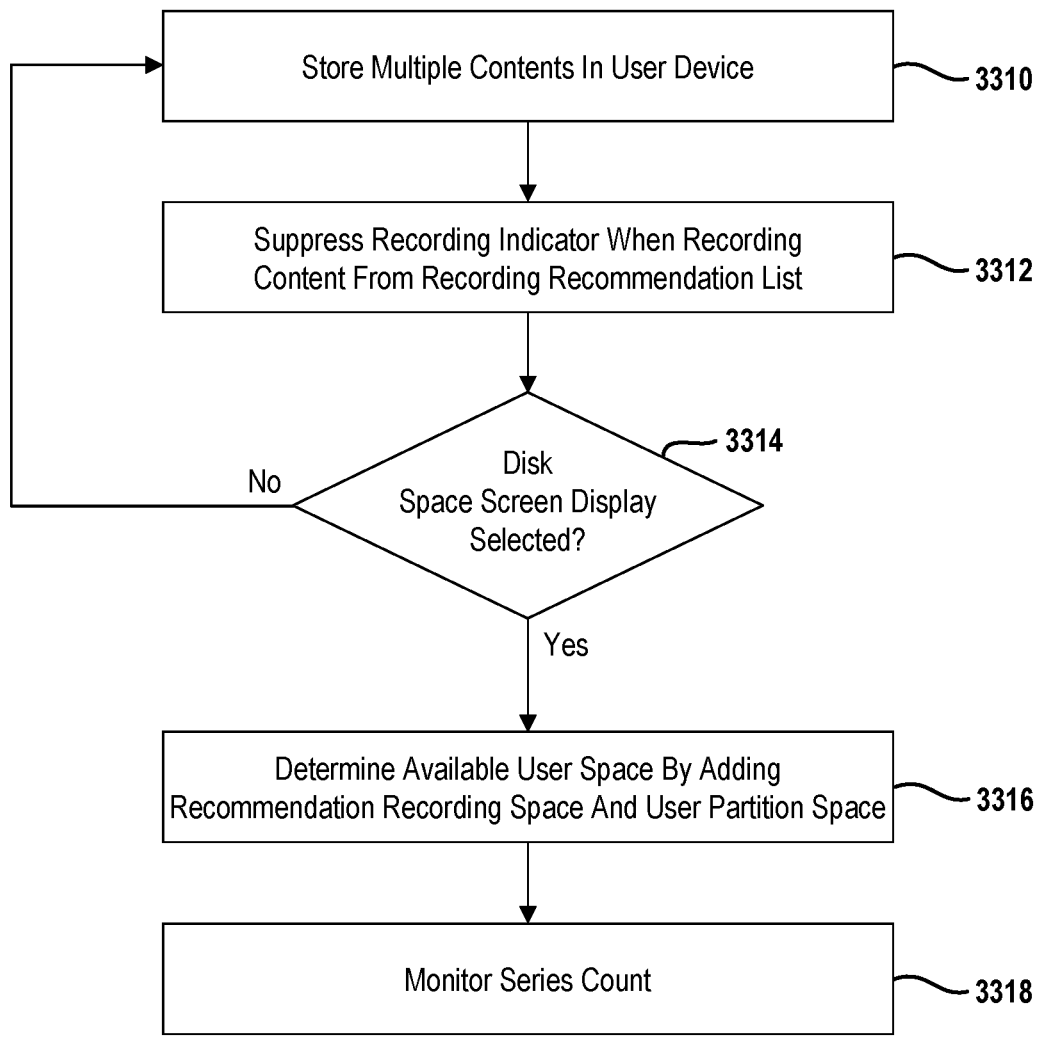
FIG. 33 is a flow chart of a method for displaying indicators according to the present disclosure.

Referring now to FIG. 33, multiple content may be stored in the user device. As mentioned above, content may be stored under user request for automatic from the recording recommendation list. In step 3312, the recording indicator is suppressed when recording content from the recording recommendation list is set forth above. The content may be recorded in the user partition of the user device.

In step 3314 when a disc space screen display is selected step 3316 available user space may be determined by adding recommendations recording space and the user partition space. The disk space availability is typically determined for only the user partition portion of the memory. In this example the user partition availability is determined by subtracting the user requested content from the overall availability. The recommended recording content space is not included in the memory space available. In step 3318 the available partition space is displayed to the user.

Referring back to step 3314, if the disk space availability is not requested step 3310 is again performed.

Figure 34:
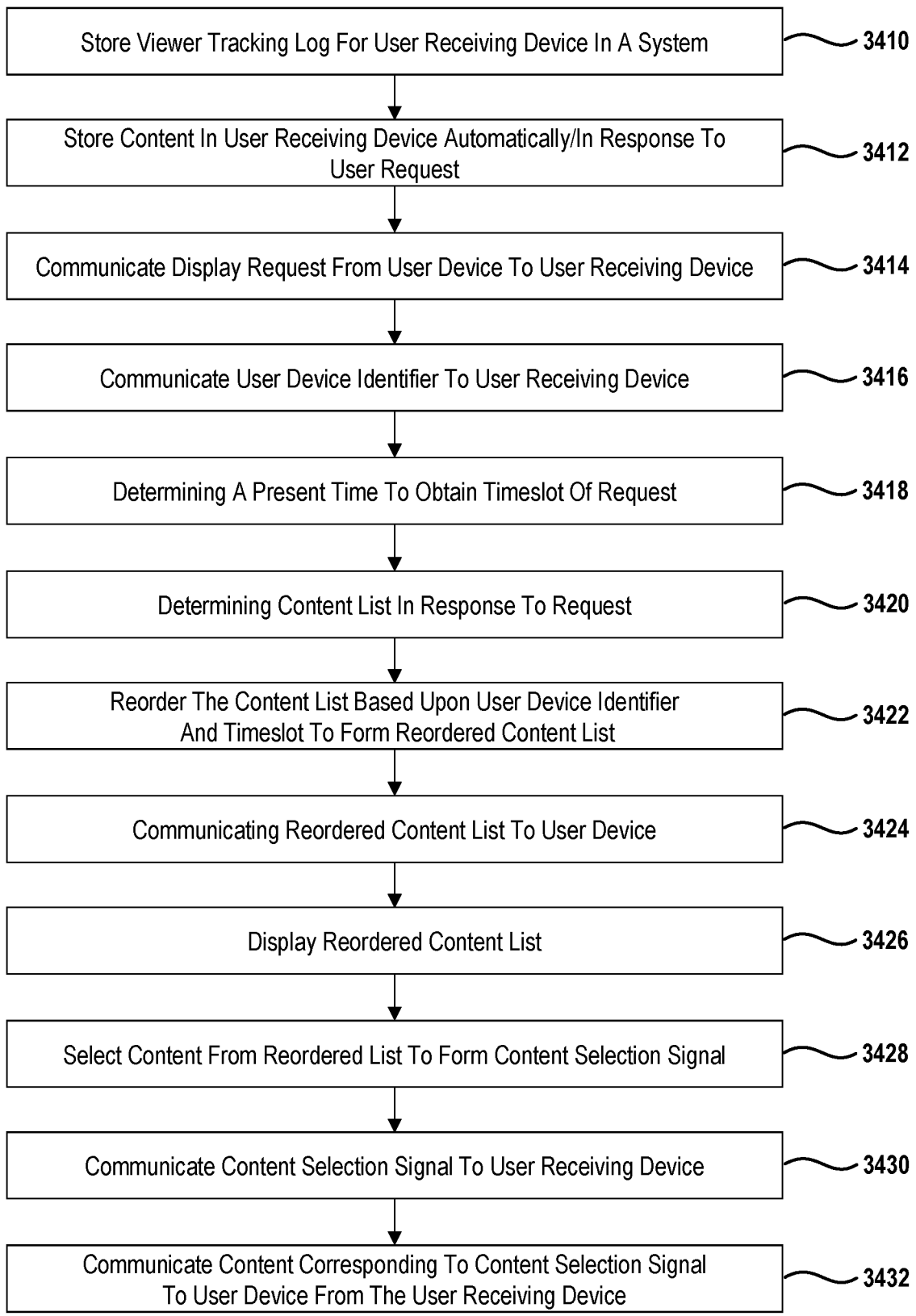
FIG. 34 is a flow chart of a method for generating a screen display for recommended recordings.

Referring now to FIG. 34, a method for displaying content associated with a user device is set forth. As briefly described above, when a user requests a display of recorded content, the display may be reordered according to the user device identifier and the time slot corresponding to the time when the request was made. The user may request display of recorded content directly or indirectly. Indirect requesting may be performed through a menu selection, such as a grid guide selection. Different types of requests are described further below.

In step 3410, a viewer tracking log for the user receiving device is generated. The viewer tracking log may keep track of all of the viewers within a system. That is, all of the client devices and content viewed directly at the server may be accounted for. As mentioned above, the viewer tracking log may keep track of the content viewed at each individual client device. In step 3412, content is stored in the user receiving device based on a recommendation or in response to a user request. Automatic recording may take place using the recommended content determined in response, at least in part, to the viewer tracking log. A user may also request content be stored within the user receiving device. This may be performed using a user interface such as a remote control device and performing various selections therewith. Content may be stored in the user receiving device in a digital video recorder or the like. As mentioned above, automatically saved content may be saved in the network partition while user requested content may be stored in a user partition.

In step 3414, a display request is communicated from a user device to the user receiving device. Carrying forward with the client device example, a client device may communicate a request for display from a set top box or home media center. As mentioned briefly above, the request for display may take place through various menus selections on a graphically user interface. The display request may be a direct request for a content list or an indirect request through performing another function such as requesting a program guide. The display request may take the form of a recommendation request, a playlist request, a favorites list request, a pay-per-view list request, a movie guide request or through a program guide request wherein road ads are substituted for banners corresponding to content.

In step 3416, a user device identifier is communicated to the user receiving device at the same time or nearly the same time as the display request.

A determination is made at step 3418 for the present time. The present time is used to obtained the time slot of the request for a display. In step 3420, a content list is determined in response to the request. The content list may be content suitable for any of the client devices in a client server relationship, for example.

As mentioned above, it may be desirable to reorder the content list based upon the user device identifier and the time slot corresponding to the time of the request to form a reordered content list. This is performed in step 3422. Although the same content list may be generated for each request, the reordering of the content list may be performed differently for each of the client device within the system. Reordering takes place in the server or home media center prior to communication with the user device.

In step 3424, the reordered content list is communicated to the user device. In step 3436, the reordered content list is displayed on a display associated with the user device. In step 3428, content from the reordered list is selected to form a content selection signal. In step 3430, the content selection signal is communicated to the user receiving device. A user identifier may also be communicated with the content selection signal. In step 3432, content corresponding to the content selection signal is communicated to the user device from the user receiving device. The content selection signal and the content are communicated through a local area network that is formed between the user receiving device and the user device.

Figure 35A:
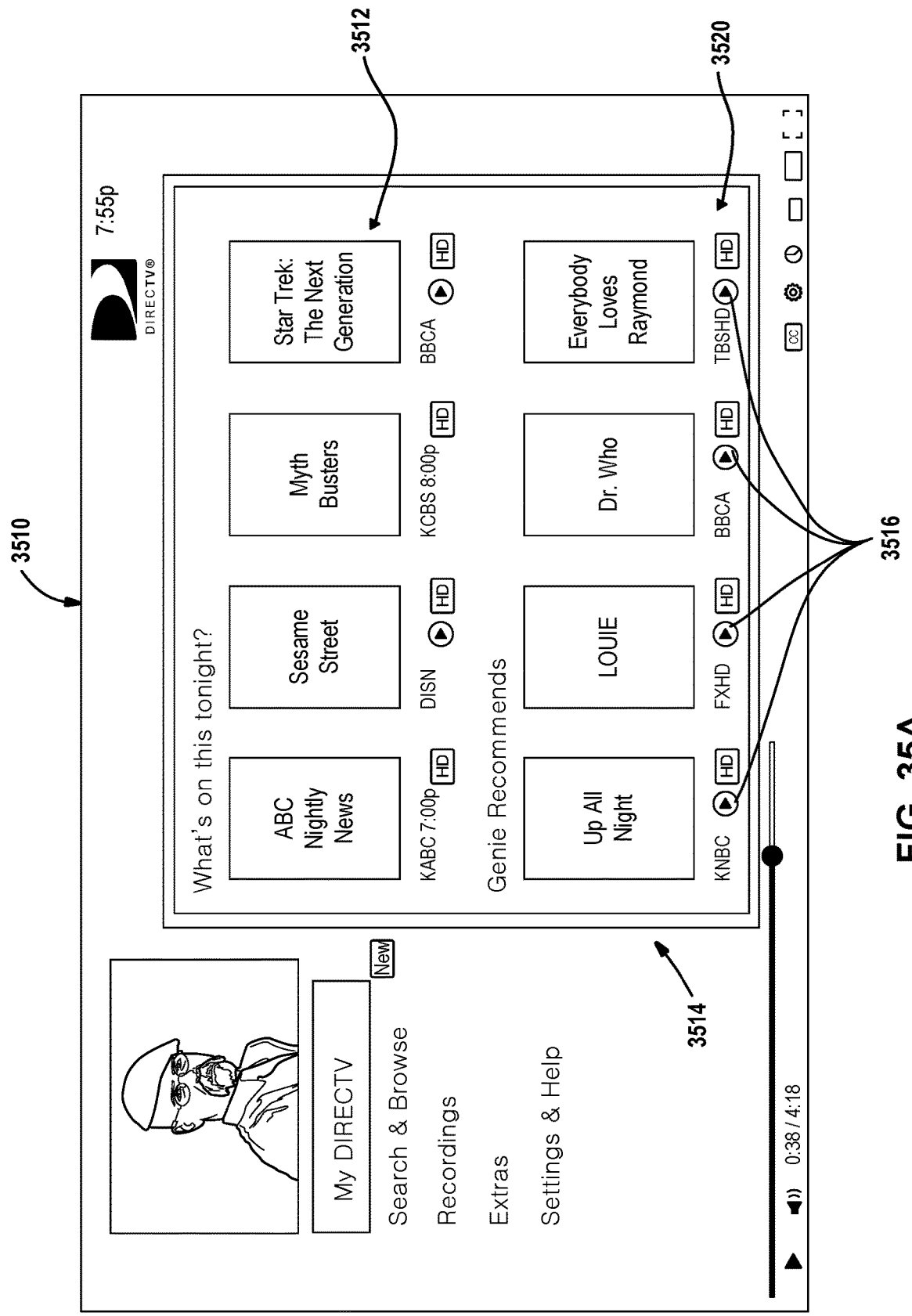
FIG. 35A is a screen display illustrating "What's On" and recording recorded recommendations for a first user.

Referring now to FIG. 35A, user interface 3510 includes a What's On portion 3512 and a recommended recording portion 3514. The content in the portion 3514 is content that is either fully or partially recorded within the user device. As mentioned above, the recommended recordings may be stored in a user partitions, network partition or both. Recording indicators 3516 may be used to indicate the content is stored in the user device. The content in the What's On portion 3512 was described above. In the recommended recording portions 3514, "Up All Night", "Louie", "Mythbusters" and "Everybody Loves Raymond" is provided a sorted content list. It should be noted that the recorded content list 3514 may be scrolled using the arrow indicator 3520.

Figure 35B:
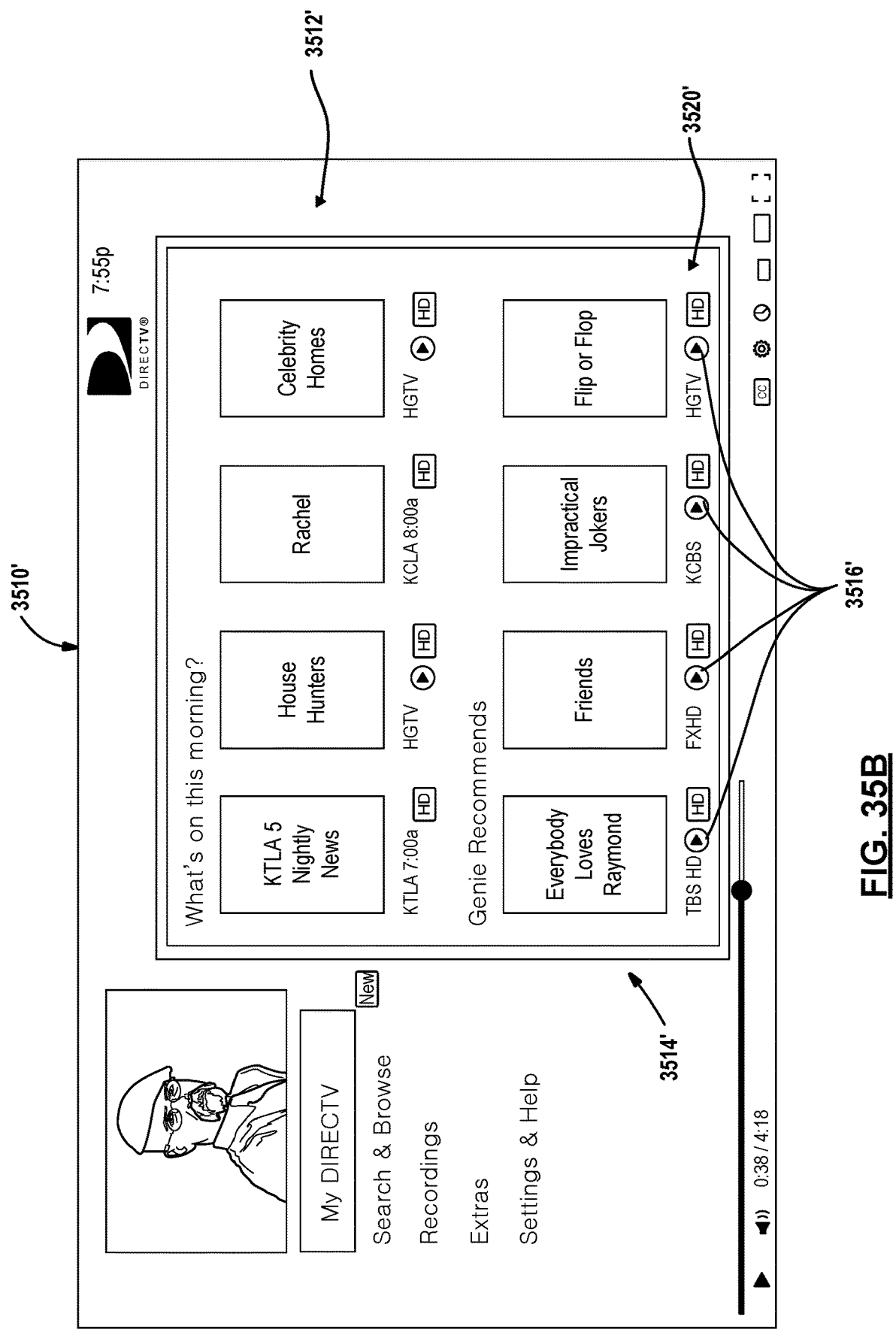
FIG. 35B is a screen display illustrating "What's On" and recording recorded recommendations for a second user.

Referring now to FIG. 35B, another user interface 3510' as requested by a different user device is set forth. In this example, the reordered content list displays "Mythbusters", "Friends", "Impractical Jokers" and "House Hunters". It should be noted that the recorded content list 3514 may be scrolled using the arrow indicator 3520'.

Figure 36:
FIG. 36 is a screen display illustrating an ordered play list for a first client.

Referring now to FIG. 36, a screen display 3610 illustrates a playlist 3612 that has been reordered for a client within a network. A playlist is content that was requested to be recorded within the user receiving device by the user. The requested content is stored and displayed when selecting a button on the remote control device. The client device associated with the remote control device communicates a client identifier to the user receiving device. The order of the playlist may therefore be changed when the playlist is communicated to the client device. The playlist for other client devices may also be changed according to the view tracking log and recommended recordings associated with the other client device.

Figure 37:
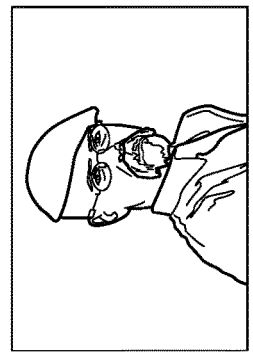
FIG. 37 is a screen display showing guide banners corresponding to recorded content.

Referring now to FIG. 37, a screen display 3710 illustrating a plurality of guide banners or row ads 3712, 3714 is set forth. The row ads 3712, 3714 may provide a quick tune method so that a user can select the row ad and tune directly to recorded content stored within the user receiving device. The grid guide 3720 provides a plurality of television listings 3722, 3724. The row ads 3712, 3714 are displayed adjacent channels. More or fewer numbers of recommended recordings may be displayed as row ads. The row ads may also be interspersed so that while the user is scrolling through the grid guide, a different recommendation based on the recorded recommendation lists is illustrated by using a row ad. Displaying a row ads may be performed with multiple row ads displayed at one time or the row ads be interspersed periodically throughout the grid guide. The grid guide may have regular row ads or irregularly spaced row ads.

Figure 38:
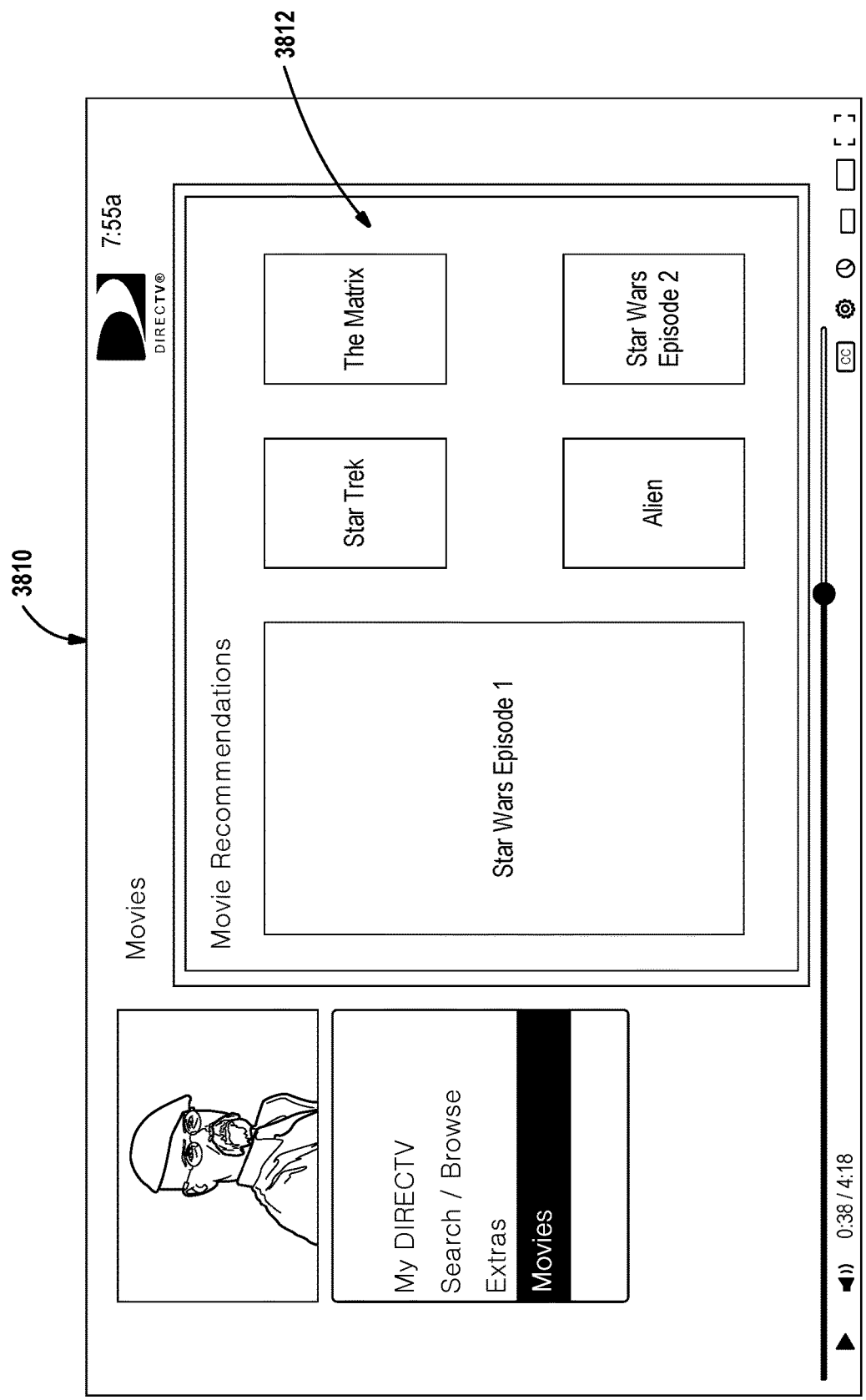
FIG. 38 is a screen display of a movie recommendation screen display.

Referring now to FIG. 38, a movie recommendation screen display 38 is illustrated displaying recommended movies. In this example, a movie recommendations list 3812 is illustrated by using posters illustrating recommended movies. The list includes "Star Wars-Episode 1", Star Trek", "The Matrix", "Alien" and "Star Wars-Episode 2". As mentioned above, this order may be performed only for one of the use devices or client devices upon request from the user device or client device. Another client device may include another order. It should also be noted that the movie recommendations may be for movies recorded within the client device or for pay-per-view movies that have also been recorded within the client device. Pay-per-view movies may be recorded in the network partition so that the user partition space is not consumed by unrequested recommendations.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
storing content to form stored content and a stored content list that corresponds to the stored content;
communicating, from a first user device, a first display request for displaying the stored content list and, from a second user device, a second display request for displaying the stored content list, said first display request comprising a first user device identifier and said second display request comprising a second user device identifier;
determining a first timeslot corresponding to the first display request and a second timeslot corresponding to the second display request;
retrieving, the stored content list having a set of content titles corresponding to stored content list;
reordering, the content titles of the set of content titles corresponding to the stored content list in response to a first timeslot viewing profile corresponding to the first timeslot and the first user device identifier to form a first reordered stored content list;
while maintaining the stored content list, reordering the same set of content titles of the set of the stored content list in response to a second timeslot viewing profile corresponding the second timeslot and the second user device identifier to form a second reordered stored content list;
communicating, the first reordered stored content list to the first user device;
communicating, the second reordered stored content list to the second user device;
displaying the first reordered stored content list at a first display associated with first user device; and
displaying the second reordered stored content list at a second display associated with second user device.

2. The method as recited in claim 1 wherein storing comprises storing content in a digital video recorder of a server device and wherein communicating a first display request comprises communicating the first display request from a first client device in communication with the server device through a local area network.

3. The method as recited in claim 1 wherein storing content comprises storing content based on previously watched content.

4. The method as recited in claim 1 wherein storing content comprises storing content based on previously watched content and related content that is related to the previously watched content.

5. The method as recited in claim 1 wherein storing content comprises storing content based on user initiated recordings.

6. The method as recited in claim 1 wherein communicating the first display request comprises communicating a first request for a first recommendations list and wherein displaying comprises displaying first recommendations corresponding to the first reordered stored content list.

7. The method as recited in claim 1 wherein communicating the first display request comprises communicating a first request for a first recommended movies list and wherein displaying comprises displaying first recommended movies corresponding to the first recommended movies list.

8. The method as recited in claim 1 wherein communicating the first display request comprises communicating a first request for a pay-per-view movies list and wherein displaying comprises displaying pay-per-view movies corresponding to the pay-per-view movies list.

9. The method as recited in claim 1 wherein communicating the first display request comprises communicating a first request for a grid guide and wherein displaying comprises displaying guide banners corresponding to the first reordered stored content list.

10. The method as recited in claim 1 wherein communicating the first display request comprises communicating a first request for a playlist and wherein displaying comprises displaying the playlist corresponding to the first reordered stored content list.

11. A system comprising:
a memory; and
a controller that stores content in the memory to form stored content and a stored content list that corresponds to the stored content, that receives a first display request for displaying the stored content list from a first user device through a network, said first display request comprising a first user device identifier and that receives a second display request for displaying content from a second user device through the network, said second display request comprising a second user device identifier;
said controller determines a first timeslot corresponding to the first display request and a second timeslot corresponding to the second display request, retrieves the stored content list having a set of content titles corresponding to stored content list, while maintaining the stored content list, reorders the stored content list of the set of the content tiles corresponding to stored content list in response to a first timeslot viewing profile corresponding the first timeslot and the first user device identifier to form a first reordered stored content list, and communicates the first reordered stored content list to the first user device and reorders a same set of content titles of the set of content titles in response to a second timeslot viewing profile corresponding the second timeslot and the second user device identifier to form a second reordered stored content list and communicates the second reordered stored content list to the second user device.

12. The system of claim 11 wherein;
the first user device displays the first reordered stored content list at a first display associated with the first user device and communicates a first selection from the first reordered stored content list;
the second user device displays the second reordered stored content list at a second display associated with the second user device and communicates a second selection from the second reordered stored content list.

13. The system as recited in claim 12 wherein the network comprises a local area network and further comprising a server device and wherein the first user device comprises a first client device and the second user device comprises a second client device in communication with the server device through the local area network.

14. The system as recited in claim 13 wherein the server device stores content in the memory based on previously watched content.

15. The system as recited in claim 13 wherein the server device stores content in the memory based on previously watched content and related content that is related to the previously watched content.

16. The system as recited in claim 13 wherein the server device stores content in the memory based on user initiated recordings.

17. The system as recited in claim 13 wherein the first reordered stored content list comprises a recommendations list.

18. The system as recited in claim 11 wherein the first reordered stored content list comprises a recommended movies list.

19. The system as recited in claim 11 wherein the first reordered stored content list comprises a pay-per-view movies list.

20. The system as recited in claim 11 wherein the first reordered stored content list comprises a playlist.

\* \* \* \* \*